United States Patent [19]
Beckman et al.

[11] Patent Number: 5,431,598
[45] Date of Patent: Jul. 11, 1995

[54] LARGE ENCASED MEAT PRODUCT WITH FLAT ENDS METHOD AND APPARATUS

[75] Inventors: John H. Beckman, Downers Grove; George C. Haettinger, Indian Head Park; Leonard I. Tafel, Mt. Prospect; Stuart P. Gavin; Joseph R. Guziec, both of Downers Grove, all of Ill.

[73] Assignee: Beckman Development Company, Downers Grove, Ill.

[21] Appl. No.: 173,964

[22] Filed: Dec. 27, 1993

Related U.S. Application Data

[63] Continuation-in-part of Ser. No. 1,287, Jan. 7, 1993, Pat. No. 5,277,648, which is a continuation-in-part of Ser. No. 982,027, Nov. 24, 1992, Pat. No. 5,273,482, which is a continuation of Ser. No. 714,189, Jun. 12, 1991, abandoned.

[51] Int. Cl.⁶ ............... A22C 13/00; A22C 11/00
[52] U.S. Cl. .................... 452/39; 452/38; 452/35; 452/21
[58] Field of Search .............. 452/35, 39, 37, 38, 452/21, 32, 30

[56] References Cited

U.S. PATENT DOCUMENTS

| | | |
|---|---|---|
| 1,874,453 | 8/1932 | Comer . |
| 2,669,749 | 2/1954 | Hovland . |
| 2,937,095 | 5/1960 | Zitin . |
| 3,233,281 | 2/1966 | Swift . |
| 3,480,449 | 11/1969 | Sumption . |
| 3,524,297 | 8/1970 | Falborg et al. . |
| 3,650,774 | 3/1972 | Beth et al. . |
| 3,777,331 | 12/1973 | Falborg . |
| 3,808,638 | 5/1974 | Kupcikevicius et al. . |
| 3,864,494 | 2/1975 | Kupcikevicius et al. . |
| 4,007,761 | 2/1977 | Beckman . |
| 4,013,099 | 3/1977 | Gerigk et al. . |
| 4,028,775 | 6/1977 | Tysver . |
| 4,033,382 | 7/1977 | Eichin . |
| 4,064,673 | 12/1977 | Gerigk et al. . |
| 4,132,047 | 1/1979 | Gerigk et al. . |
| 4,160,305 | 7/1979 | Tysver . |
| 4,325,413 | 4/1982 | Lenhart et al. . |
| 4,327,777 | 5/1982 | Michel et al. . |
| 4,422,215 | 12/1983 | Liekens et al. . |
| 4,466,463 | 8/1984 | Kupcikevicius . |
| 4,466,464 | 8/1984 | Kupcikevicius et al. . |
| 4,466,465 | 8/1984 | Frey . |
| 4,466,466 | 8/1984 | Raudys . |
| 4,466,984 | 8/1984 | Kupcikevicius . |
| 4,484,679 | 11/1984 | Liekens et al. . |
| 4,525,895 | 7/1985 | Raudys . |
| 4,551,884 | 11/1985 | Kupcikevicius et al. . |
| 4,562,617 | 1/1986 | Kollross . |
| 4,610,742 | 9/1986 | Rop et al. . |
| 4,621,392 | 11/1986 | Raudys . |
| 4,641,687 | 2/1987 | Kupcikevicius . |
| 4,736,775 | 4/1988 | Oxley . |
| 4,803,757 | 2/1989 | Raudys . |
| 4,842,022 | 6/1989 | Oxley et al. . |
| 5,003,666 | 4/1991 | Stall et al. . |
| 5,027,863 | 7/1991 | Kupcikevicius . |
| 5,038,832 | 8/1991 | Mahoney et al. . |
| 5,277,648 | 1/1994 | Beckman et al. .............. 452/39 |

FOREIGN PATENT DOCUMENTS

| | | |
|---|---|---|
| 902421 | 6/1972 | Canada . |
| 499894 | 6/1930 | Germany . |
| 2035268 | 6/1970 | Germany . |
| 3220488A1 | 4/1982 | Germany . |

*Primary Examiner*—Willis Little
*Attorney, Agent, or Firm*—McAndrews, Held & Malloy, Ltd.

[57] ABSTRACT

A joining system for flat end discs is used in an elongated encased food product. The food casing is joined to the flat end discs permitting food stuffing of the casing. An adhesive joining, a clamping joining, a tension band joining or a piercing joining takes place in an area external to and within the peripheral boundaries of the flat end discs. The axial outward force of the food product on the discs is thus coupled to the axial tension of the casing joined to the discs.

54 Claims, 24 Drawing Sheets

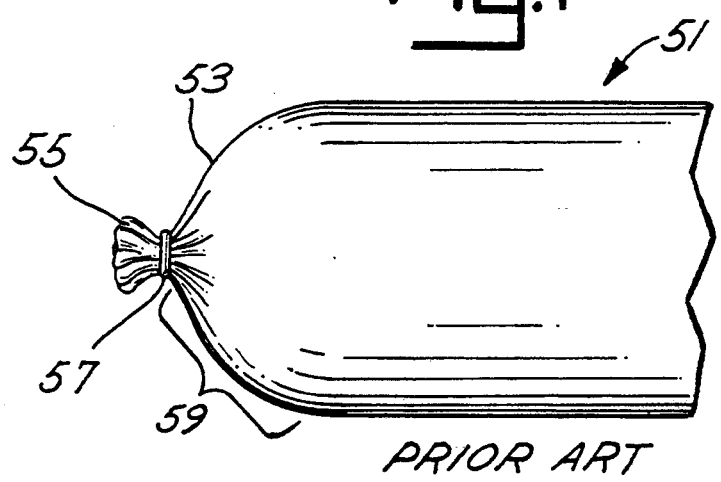
PRIOR ART
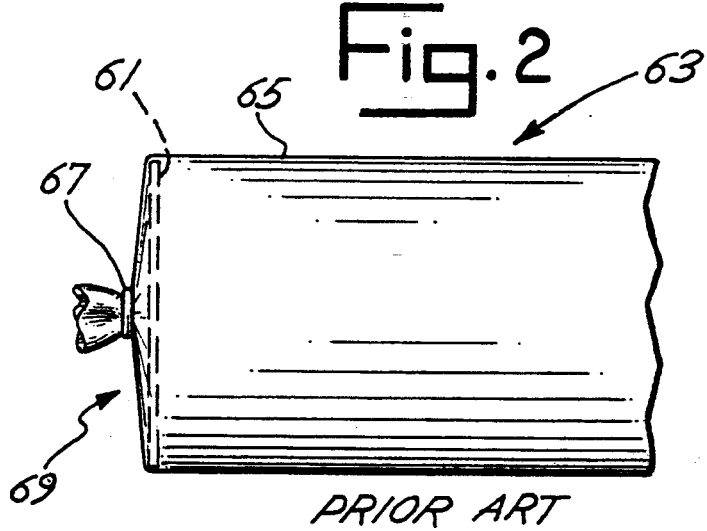
PRIOR ART
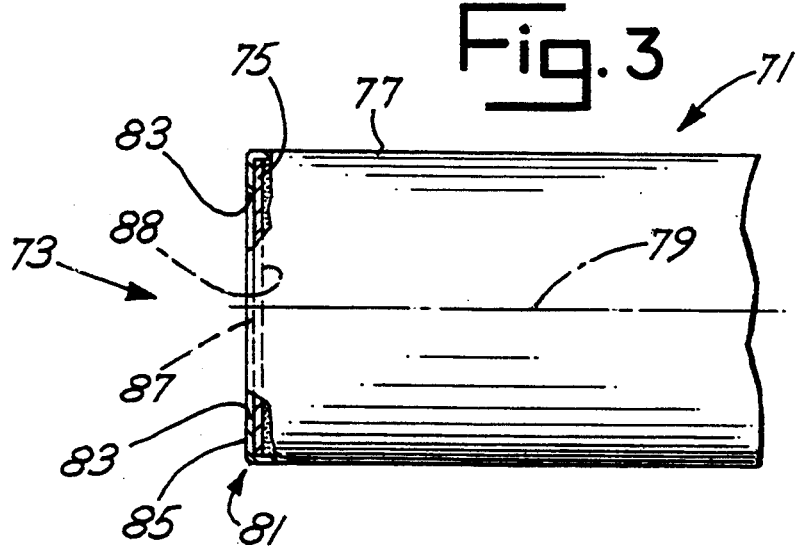

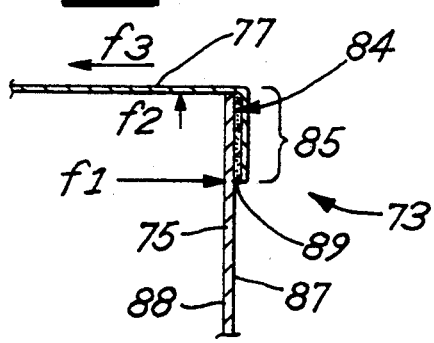
Fig.4
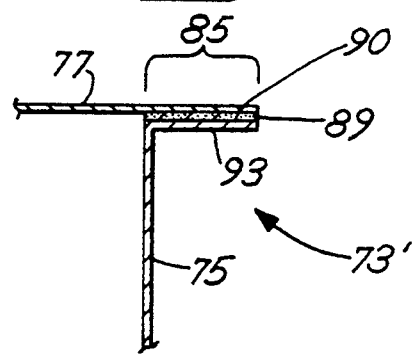
Fig.5
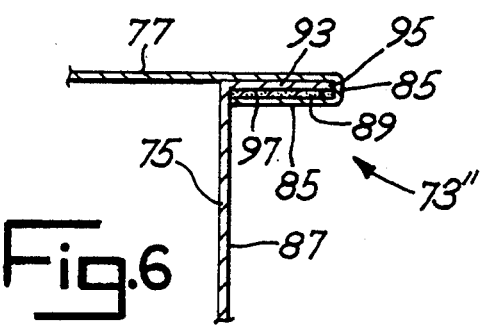
Fig.6
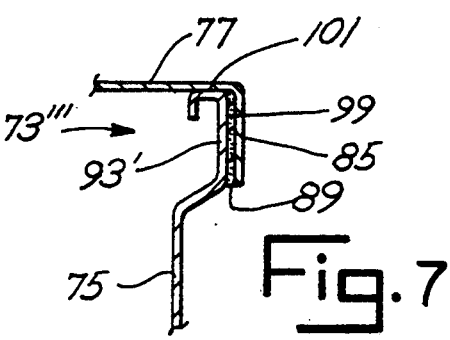
Fig.7
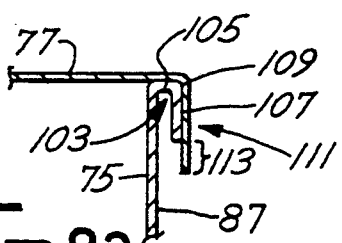
Fig.8a
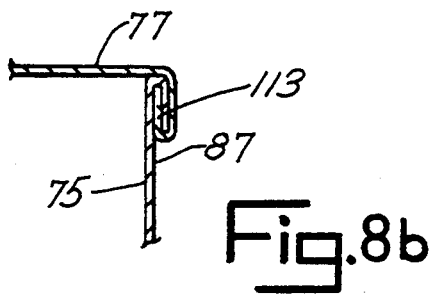
Fig.8b
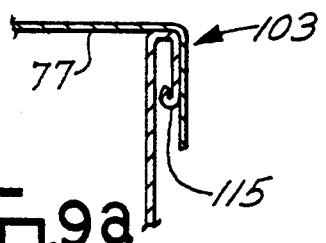
Fig.9a
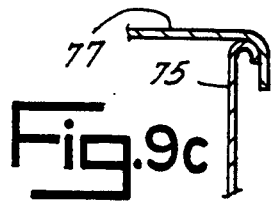
Fig.9c
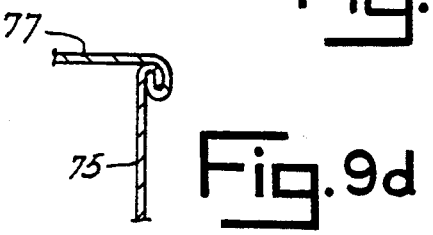
Fig.9b
Fig.9d

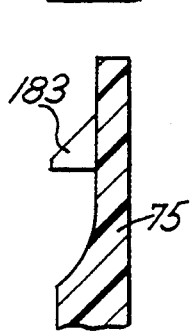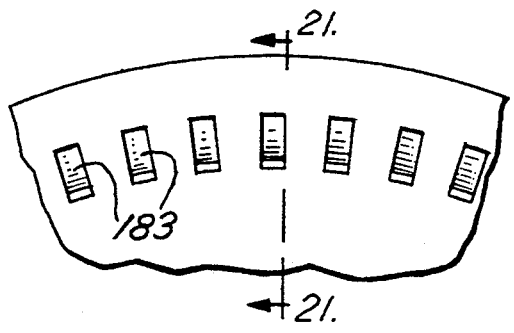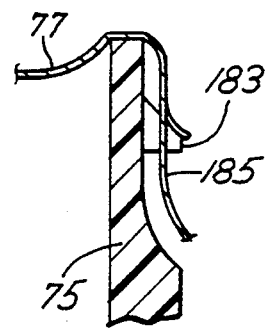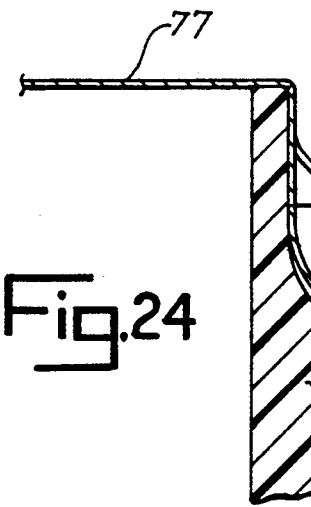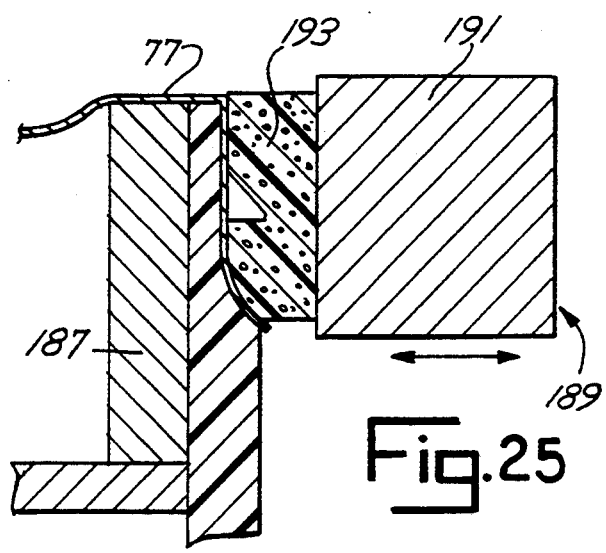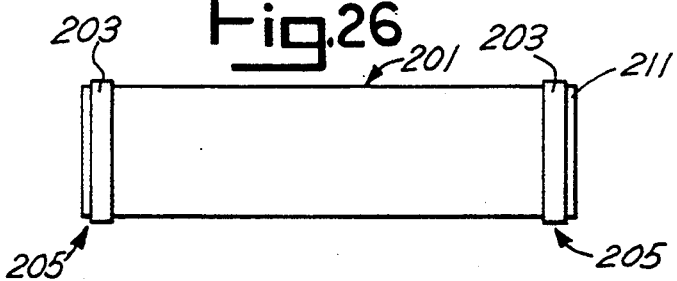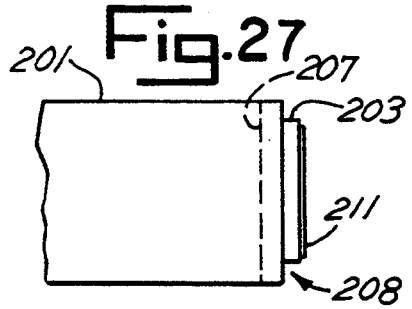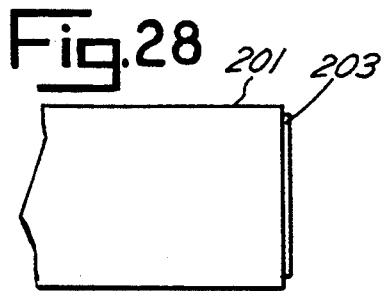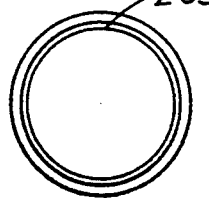

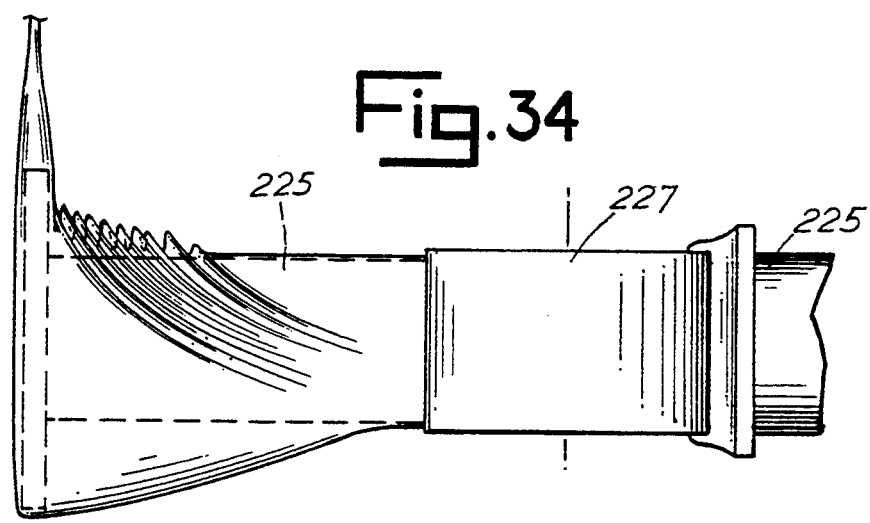
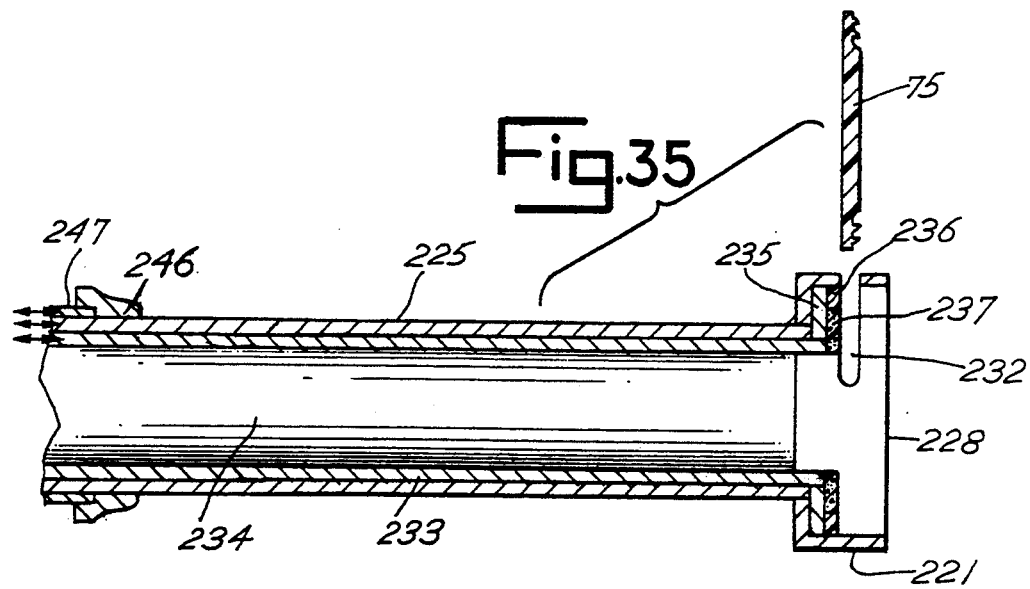
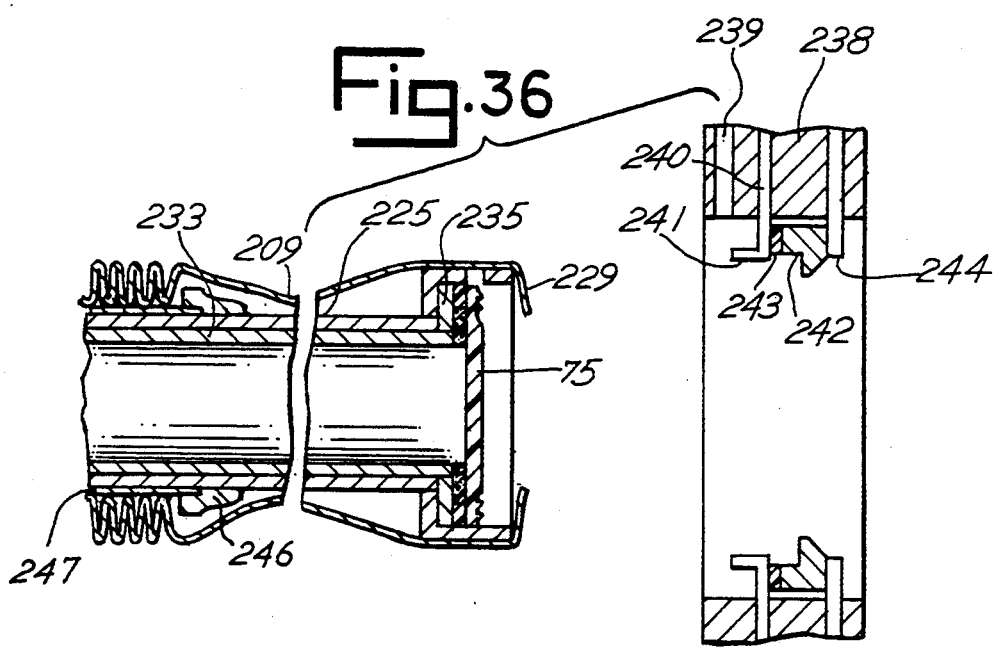

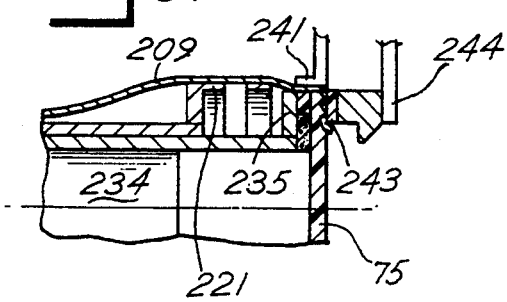
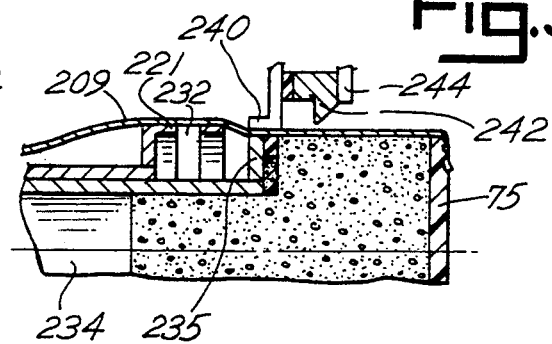
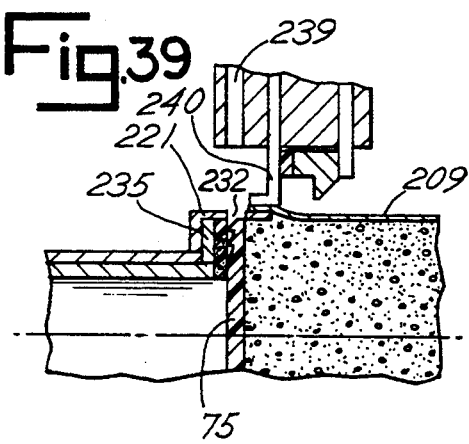
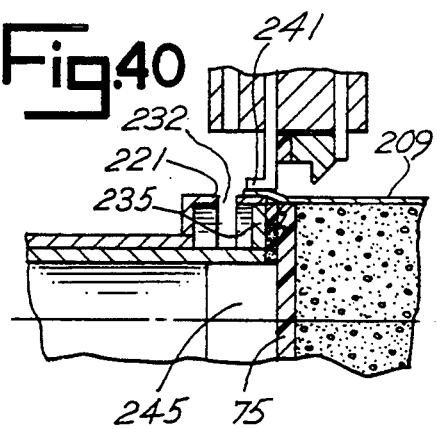
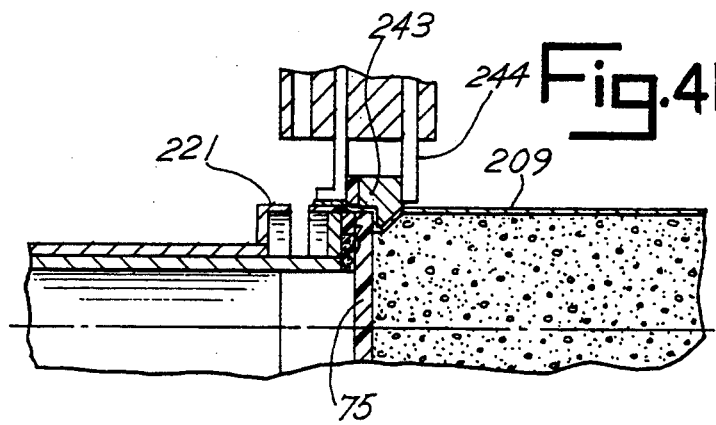

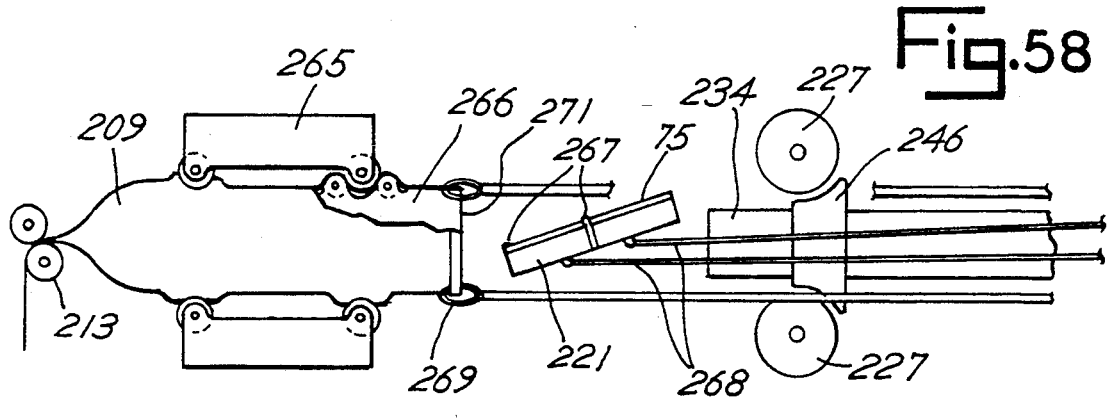
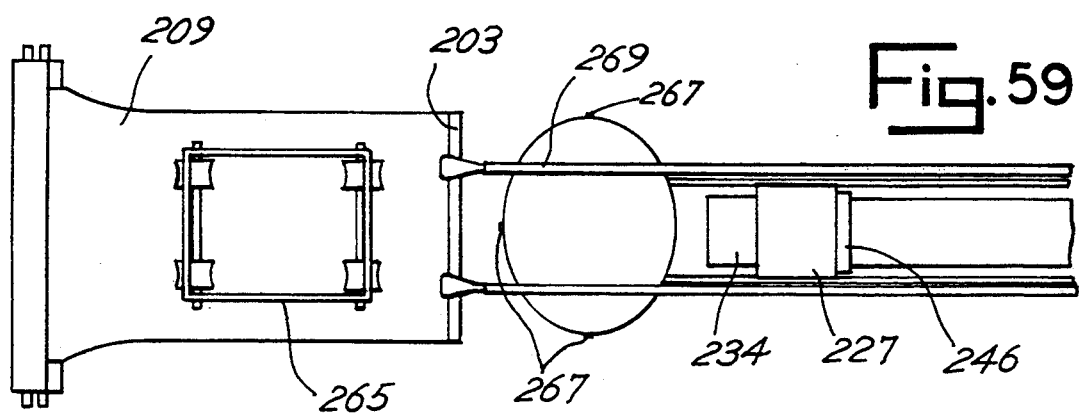
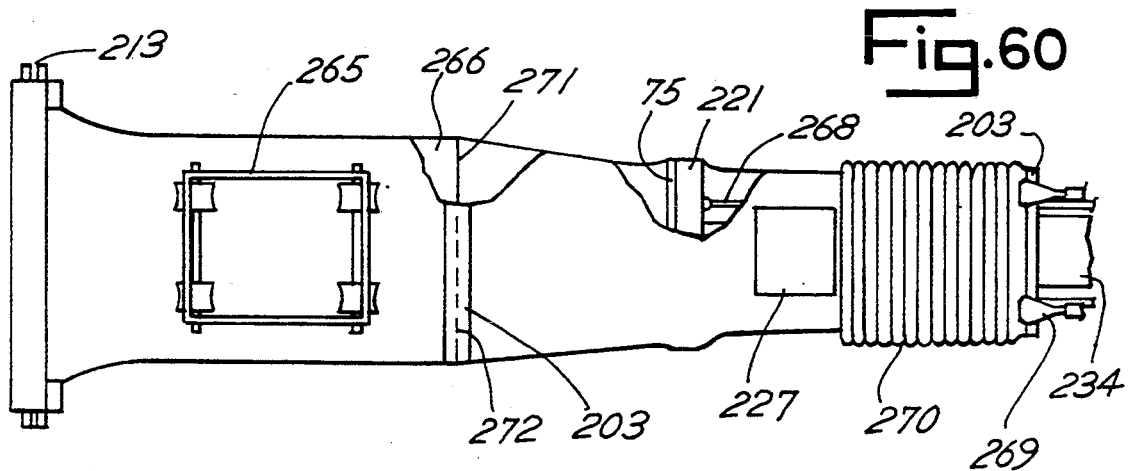

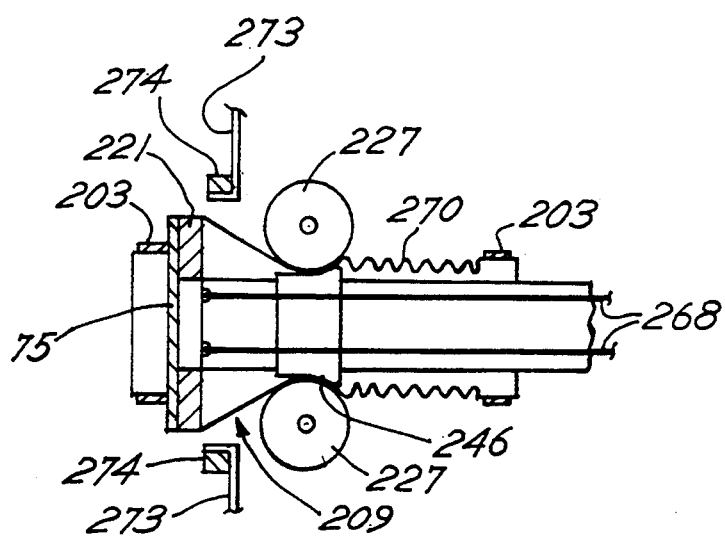
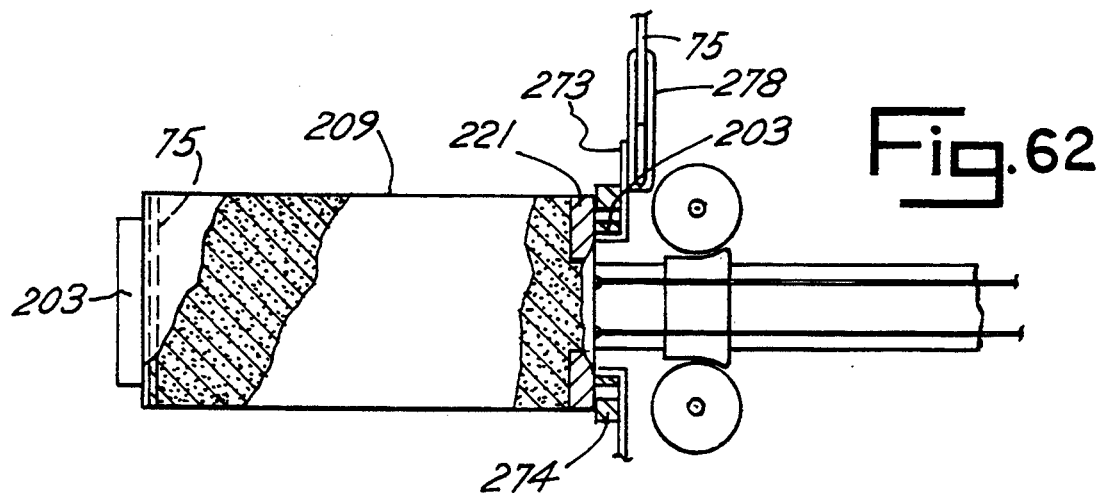

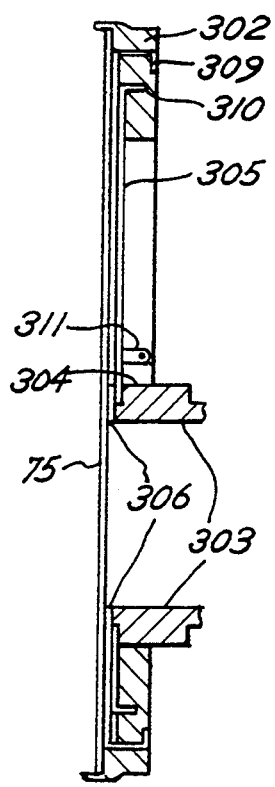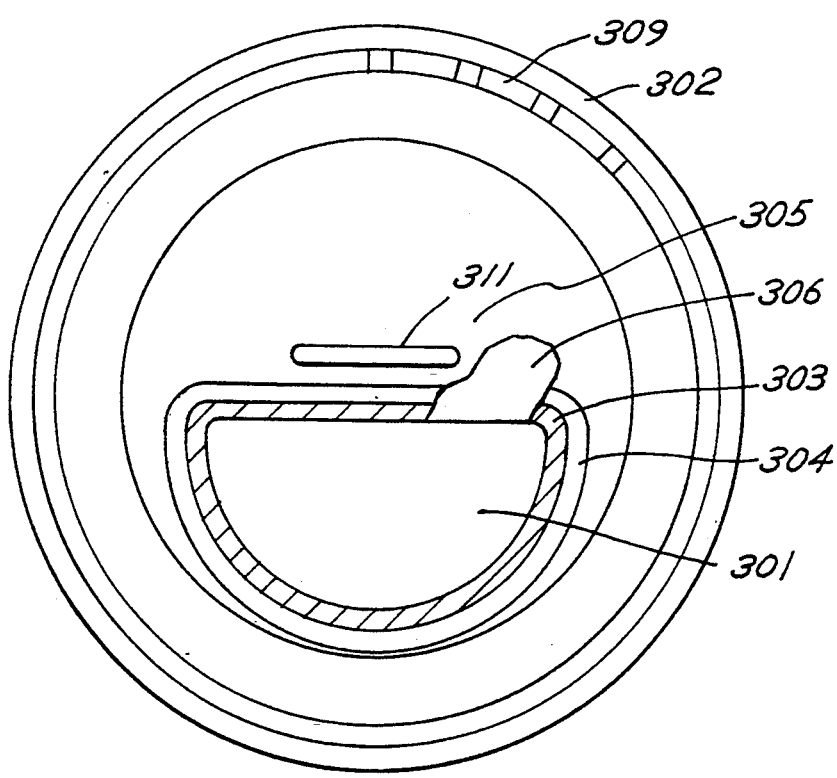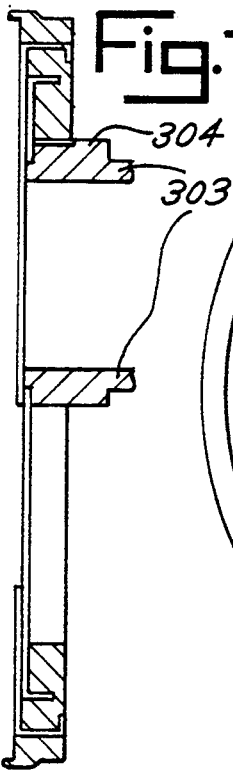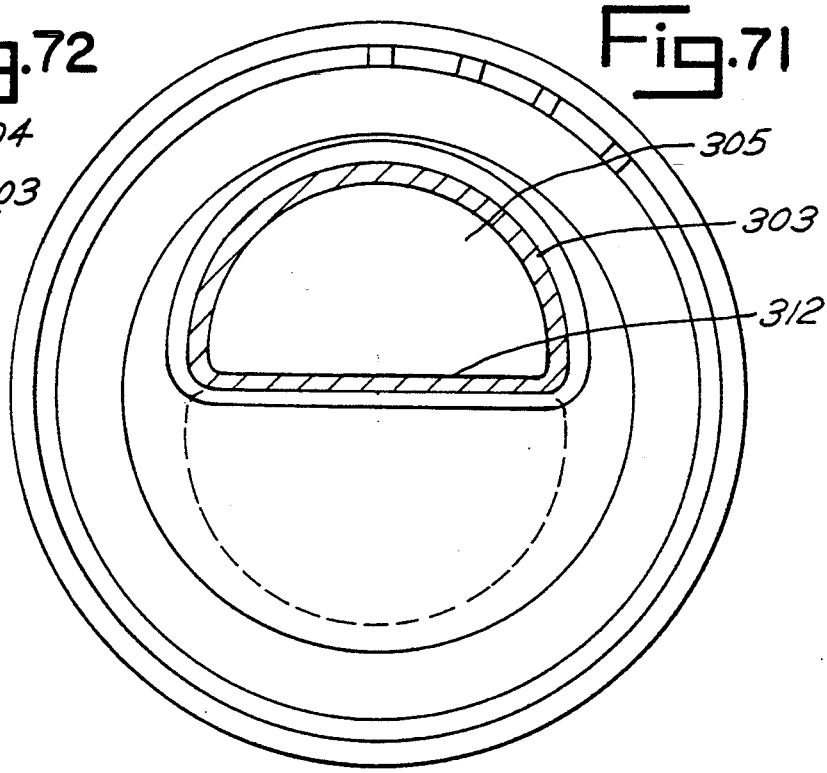

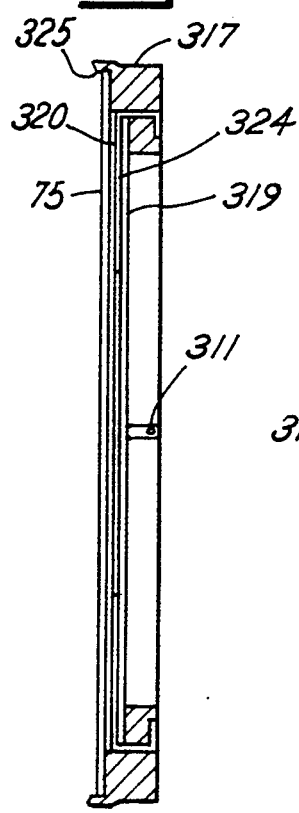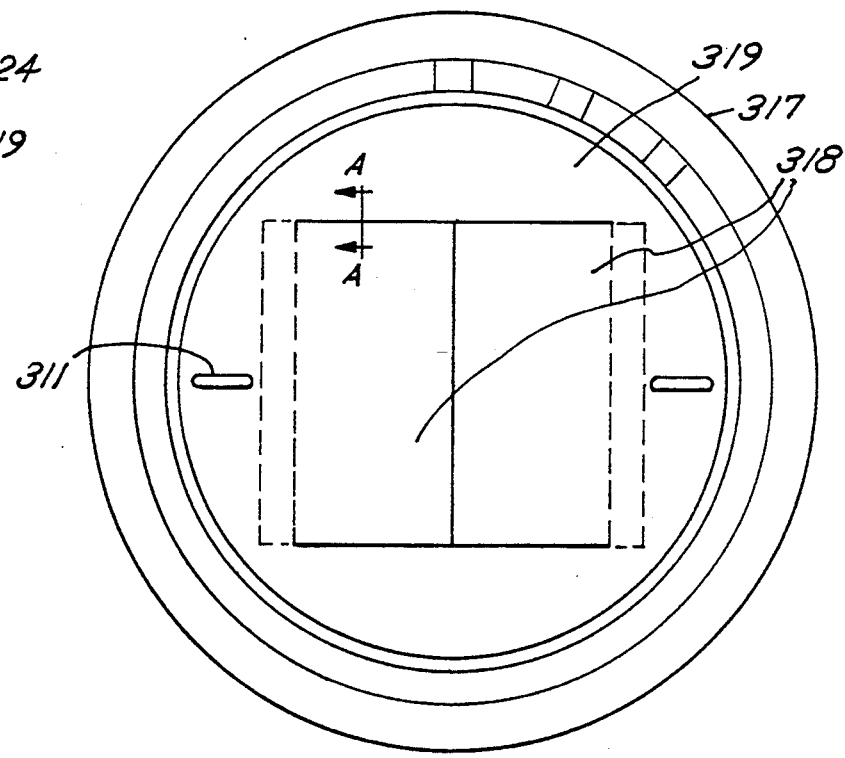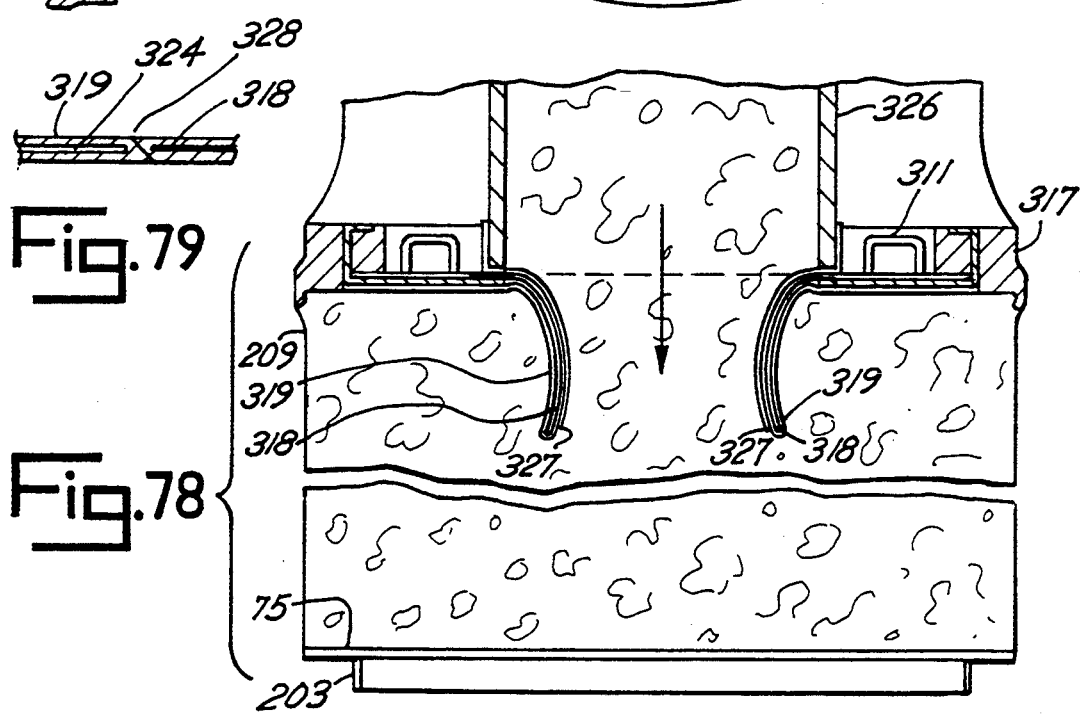

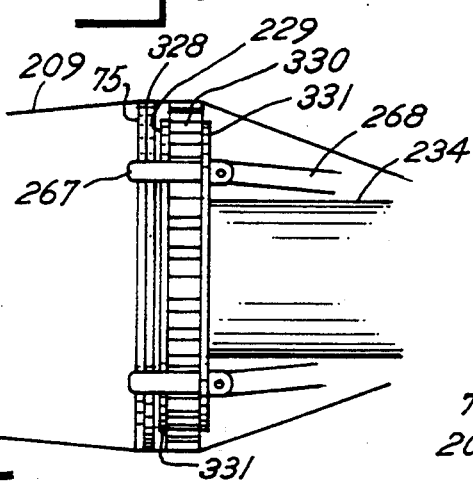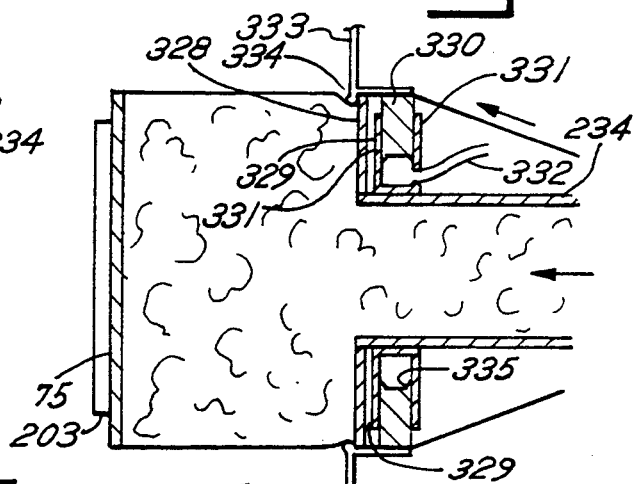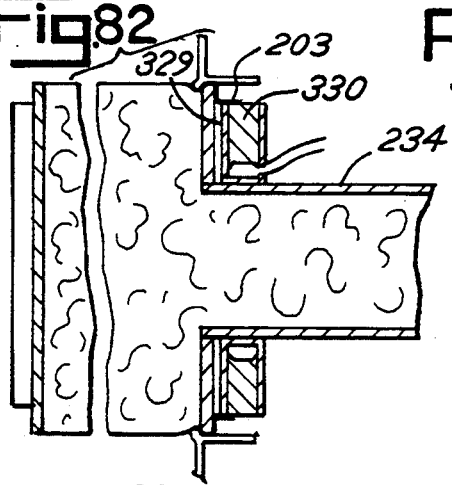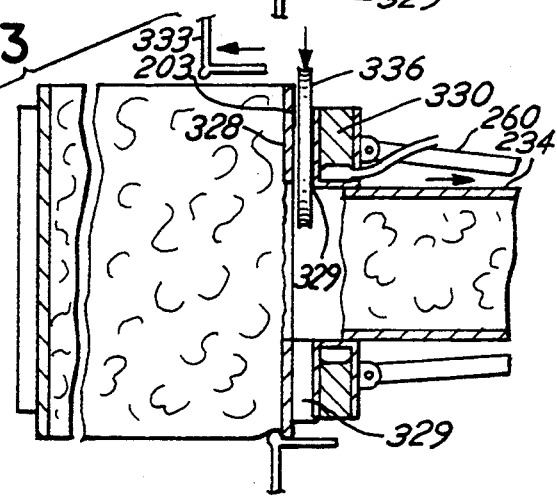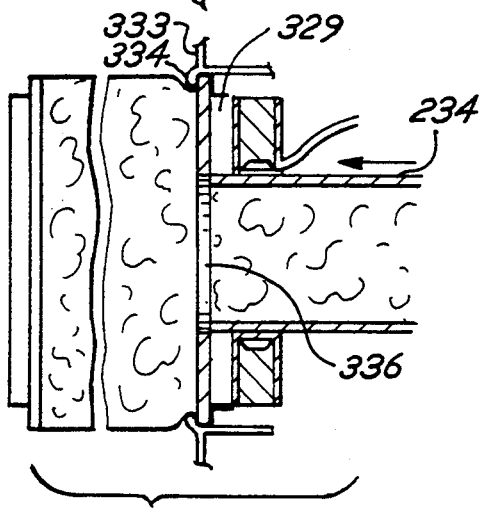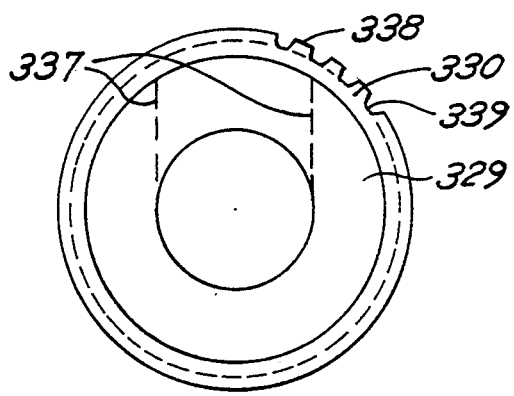

LARGE ENCASED MEAT PRODUCT WITH FLAT ENDS METHOD AND APPARATUS

RELATED APPLICATIONS

This is a continuation-in-part of U.S. patent application, Ser. No. 08/001,287, filed Jan. 7, 1993, (not U.S. Pat. No. 5,277,648), which is a continuation-in-part of U.S. patent application Ser. No. 07/982,027, (now U.S. Pat. No. 5,273,482), filed Nov. 24, 1992 in the names of John H. Beckman, et al, which is a continuation of U.S. patent application Ser. No. 07/714,189 (now abandoned), filed Jun. 12, 1991 in the names of John H. Beckman, et al., the entire interest of which is owned by the assignee of the present application.

BACKGROUND OF THE INVENTION

The present invention relates to improved packages for forming and heat processing of food, particularly meat, and more specifically relates to apparatus and method by which dimensionally uniform processed meat products for high efficiency production and slicing are formed.

In the manufacture of sausage products, meat emulsion is prepared from comminuted meat together with fillers, seasonings, spices, etc. A tubular food casing, such as one containing nonedible cellulose, is loaded onto a stuffing horn of a filling machine and stuffed with the meat emulsion. In the case of small sausage products, like frankfurters, the filled casings are twisted, tied or clipped into suitable links at predetermined intervals and further processed. For larger sausage products, like bologna, salami, and the like, the meat emulsion is introduced into larger heavier walled casings or casings having fibrous reinforcements, and formed into chubs or lengthy individual sausage sticks or logs. The manufacture of other types of processed meats is carried out using the same general method.

In preparing larger diameter processed meat products, like bologna, an important consideration is the maintenance of accurate size control over the entire length of the log. It is important that the diameter of larger products be controlled very carefully so that meat packers are able to cut the log into slices of predetermined thickness and diameter for repackaging. The objective is to have a given number of slices weigh a precise predetermined amount for each package. That is to say, a given number of slices should weigh as close as practical to one pound or some other preselected weight. In addition, precise diameter control alone is important for vacuumized packages where the product must support the package and where varying diameters would be objectionable.

A further important consideration in the preparation of larger diameter processed meat products for repackaging concerns end portions. Processed logs which have rounded ends provide poor yields. Some degree of taper is usually present with round ends and further decreases yield. The end portions of a bologna log, for example, which are normally rounded and which may also be tapered can result in the loss of several inches of meat from each end of the sausage. Significantly undersized sliced product is not usable in most vacuumized display packages and must be reworked at significant cost.

In an effort to maximize yields of sliced product for repackaging, methods have been developed for eliminating rounded and undersized ends. One popular approach to this problem has been to prepare cylindrically shaped sausage products having flat ends by utilizing a variety of methods and apparatus. While such attempts have attained some degree of success, none has proven to be entirely satisfactory.

For example, U.S. Pat. No. 3,777,331 discloses apparatus for preparing sausage products with flat ends in which the meat mass is placed in a loading chamber having an undersized flat end plate at each end. The meat mass is compressed and extruded from the chamber and through a stuffing horn with one end plate at each end of the meat mass. A continuous length of tubular casing is filled with successive charges of the meat mass and end plates by transporting the free end of the casing with a conveyor onto the end of the horn from which the charges of meat mass are extruded. The casing end is clamped onto the stuffing horn and the conveyor retracted to its starting position whereupon the meat mass and end plates are extruded into the casing. Because the end plates and meat mass pass through the inside of the stuffing horn while the casing is clamped on the outside of the horn, the casing has the potential for a relatively loose fit over the encased meat product and end plates. This is undesirable because of possible "fat-out" and jelly pocket formation from an accumulation of water with fat and/or gelatin. Such products have an unappetizing appearance, and consequently, have poor customer acceptance. The casing of U.S. Pat. No. 3,777,331 must be stretched substantially to prevent fat out, etc., which can result in tapering of each product end as it approaches the end plates which are no larger, and slightly less than the diameter of the unstretched casing.

U.S. Pat. No. 3,650,774 discloses a casing structure with flat ends attached to thick end plates wherein the casing is clamped against the broad peripheral surface of the end plates by rings with a tapered bore. The casing is filled through a hole in one of the end plates. U.S. Pat. No. 3,650,774 also does not recognize the importance of casing stretch on product quality, nor the affect of casing stretch upon end taper when the end plates have the same periphery as the casing prior to stretching.

Other representative examples of devices for preparing dimensionally uniform encased sausage products with flat ends are disclosed by U.S. Pat. Nos. 4,551,884 and 4,466,465, both of which employ elaborate end plate assemblies having central openings which are costly to fabricate. These end plates, called "flattening annular disks" require a central opening because they are mounted onto the end of the stuffing horn. The hole, however, makes it necessary to gather the casing over the face of the disk and apply a clip to close the opening and avoid loss of meat emulsion during filling. However, this is not enough to prevent substantial loss of emulsion pressed through the hole during stuffing which fills the space between the disk and the gathered and clipped casing. Consequently, it is necessary to use a thin tubular film connecting the disks.

Large producers make 80% of processed meat in casing for slicing and repackaging. Each plant may make thousands of logs daily from each automatic stuffing machine which typically has one operator. The operator loads the logs into processing racks as well as tends to the stuffing machine, and replenishes casing and clips. For the sole operator to apply clamps to each end of each log, as required by the system shown in U.S.

Pat. No. 3,777,331, for example, would substantially increase labor cost.

In addition, the bulk of each clamp would cause problems when the logs are loaded onto the horizontal processing racks. The logs are placed lengthwise upon parallel spaced rods that support the full length of the log. Clamps on each end of a log would prevent the log ends from lying smoothly on the rods and cause the product to be misshapen after processing. In addition, clamps added to the thick flat end plates double the number of extraneous parts that must be handled by the processors.

Accordingly, it would be highly desirable to have an improved system of packaging for encased meat products, including those which are suitable for filling with whole muscle and chunk style products to produce dimensionally uniform products, and which have flat ends to maximize yields of sliced products for repackaging. This would especially include large size fibrous cellulose casing packages for forming and heat processing of meat and other food that provide dimensional uniformity for high efficiency production and slicing.

A U.S. patent application Ser. No. 07/714,189, filed Jun. 12, 1991, in the name of the present inventor as a coinventor, describes a casing with reinforcements on its terminal ends that can coact with end plates to resist the axial forces generated when the casing is stuffed with food product and processed under pressure. This application, Ser. No. 07/714,189 is incorporated herein by reference, as are subsequent related applications, Ser. No. 08/001,287 and Ser. No. 07/982,027.

SUMMARY OF THE INVENTION

It is therefore an object of the invention to provide a method and apparatus to make a food package for processing meat comprising a tubular casing stretched tightly over a contained meat product with one or both ends of the tubular casing held at the peripheral zone of a rigid flat end unit of the same diameter as the stretched casing and with minimum casing length requirement for a given quantity of sliced meat.

It is a further object of the invention to eliminate one or both rounded and tapered ends on processed meat for preslicing prior to repackaging for sale and thereby to reduce rework to a minimum.

It is a further object of the invention to provide an alternative to clips presently used to close the ends of casing before and after stuffing and to eliminate the cost of clips and clipping apparatus as well as their safety hazards and maintenance problems.

It is a further object of the invention to provide a method and apparatus to make a food package with flat ends for forming and processing meat that can utilize a variety of casings including: cellulosic, fibrous reinforced cellulose and other plastic films such as polyamide, polyester, saran and others having suitable properties, such as copolymers and coextrusions and coated films.

It is a further object of this invention to provide a method and apparatus to make a food package that can effectively utilize shrinkable film as well as stretchable film.

It is yet a further objective of this invention to provide for the holding of food product casing together with end plates without resorting to separate clamps around the edge of the end plates.

It is yet a further object of this invention to provide suitable apparatus and methods of assembling a food package of the previous objectives.

It is yet a further object of the invention to utilize end plates of non-circular configuration as well as circular, so the product can be produced with non circular cross section if desired. This would include ovals to accommodate flattened ham, squares and rectangles for externally restrained stuffing and D-shaped product.

It is yet a further object of the invention to provide apparatus for making an optional food product in which one end has a flat end plate without a clip and the other end being rounded and clipped.

It is another object of the invention to provide good handling characteristics to the logs and the end units, for product production in modern high production facilities.

It is a further object of this invention to provide a food package that can be produced on high speed automatic machines with minimum labor.

It is a further object of this invention to provide a food package that can be efficiently made from flat casing in long lengths and therefore does not require preshirred casing.

It is yet a further object of this invention to provide an apparatus for making food package claimed in the related applications.

These and other objects of the invention are achieved in the tubular food casing embodiments and apparatus disclosed herein which relate principally to large size food casings manufactured from materials like regenerated cellulose or regenerated cellulose supported by a fibrous web, such as hemp paper. Such casings are commonly referred to as large cellulose casings and fibrous casings, respectively. These casings are employed in the manufacture of large sausage and meat products, such as cooked salami and bologna, chunked and formed ham, chicken and turkey, cooked and smoked ham butts, and the like. They are also used for dried sausage which is not cooked and for other foods such as cheese.

While large cellulose casings and fibrous cellulose casings, including coated fibrous type casings, are most widely used and preferred, this invention is also intended to include apparatus capable of using other non-edible food grade type polymeric casings, such as those comprised of polyvinylidene chloride (PVDC), polyamide and polyester. In addition, this invention also contemplates co-extruded type casings prepared with more than one type of polymeric film. The casings prepared according to this invention may also be manufactured from films having commonly used internal and external treatments, coatings and impregnations, e.g. meat release agents, meat bonding agents, as well as plasticizer and humectants, various levels of moisture, including premoisturized, ready-to-fill/no-soak type casings and those having additives, such as antimycotic agents or liquid smoke.

BRIEF DESCRIPTION OF THE DRAWINGS

FIG. 1 is a partial side view of a prior art conventional large sausage package comprised of a tubular casing, contained meat and an end clip.

FIG. 2 is a partial side view of a prior art flat end large sausage product comprised of a tubular casing, contained meat, a flat end unit and an end clip.

FIG. 3 is a partial side view of an improved flat end large sausage product comprised of a tubular casing, contained meat and a flat end unit.

FIG. 4 is a partial cross sectional side view of an adhesive joint system of FIG. 3.

FIGS. 5-7 are partial cross sectional side views of alternative adhesive joint arrangements.

FIGS. 8A-8D, 9A-B, 10A-B, 11A-B, and 12 are partial cross sectional side views of various joint systems for clamping the terminal end of a casing to a flat end unit.

FIG. 21 is a partial cross-sectional view showing a triangular piercing pin of a flat end unit.

FIG. 22 is a front view of a plurality of triangular pins of FIG. 21.

FIGS. 23-25 are partial cross sectional side views showing stages in the attachment of the casing to triangular pins of FIG. 21.

FIG. 26 is a side view of a casing having tension bands.

FIGS. 27 and 28 are partial side views of an improved product using the casing of FIG. 26.

FIG. 29 is an end view of the product of FIG. 28.

FIGS. 32 and 34 are detailed side views of portions of FIG. 30.

FIG. 35 is a side view cross section of a stuffing horn assembly and end plate prior to insertion.

FIGS. 36-43 are schematic side views of apparatus and steps for assembling an encased food product with one or more flat ends.

FIG. 58 is a schematic side view of another embodiment of apparatus and steps for assembling the encased food product with flat ends.

FIGS. 59 and 60 are top views of the apparatus and steps of FIG. 58.

FIGS. 61 and 62 are additional schematic cross-sectional side views of apparatus and steps of FIG. 58.

FIGS. 67-72 are integrated aft end plates for an encased food product.

FIGS. 76-79 are another aft end plate configuration.

FIGS. 80-85 are sizing disk apparatus in association with casing and end plates.

DETAILED DESCRIPTION OF THE PREFERRED PRODUCT AND APPARATUS EMBODIMENT

Figure 10A:
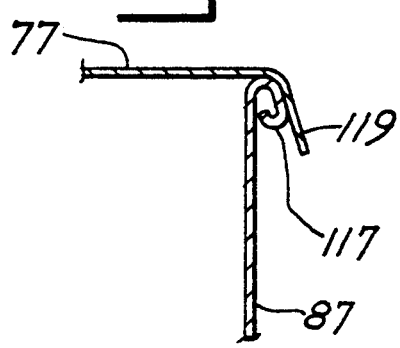

Referring to FIG. 1, a typical large sausage product 51 such as bologna, chunked and formed ham or other food products is generally tubular in form for permitting slicing and stacking for repackaging. Product 51 is closed at each end by gathering the outer casing 53 and clipping the open terminal end 55 closed by a clip 57. The manufacture of such a meat product 51 provides two rounded end portions 59, that contain meat. Such end portions 59 are not suitable for inclusion in modern sliced meat packages that require slices of uniform diameter. In addition, a few slices adjacent to the round ends are usually undersize due to the taper caused by the rounded ends.

The meat from rounded end portion 59 is normally ground and mixed with virgin meat emulsion or used in other meat products, often of lower grade. In either event, a significant cost is associated with reworking meat from the rounded ends. The amount of reworked meat is typically 1 to 1½ lbs. for a product used for packaged slices. The rework cost may be about 10¢ to 20¢ per lb.

Referring to FIG. 2, prior art methods of reducing this rework include the use of a flat disc 61 (one being shown) at each end of the product 63. Disc 61 is made of tin plated steel resembling the end units of cylindrical food cans. Disc 61 is inserted into a tubular casing 65 which had been previously clipped on one end by a clip 67. Disc 61 is manipulated into an orientation at right angles to the casing axis before the casing 65 is stuffed with meat emulsion. Orienting disc 61 is an awkward manual operation that is difficult to mechanize. An important factor in the problem is that the meat casing must be stretched 10% to 20% in diameter during stuffing and hence the disc 61 should be 10–20% larger in diameter than the casing 65. This insures full sized slices. Each disc 61 is held in place by the end portion 69 of the casing which is gathered to the center axis of the disc and clipped. Almost as much casing is used at the end of product 63 as with the rounded end meat product 51 (FIG. 1) so that the flat disc 61 has little compensating savings of production costs. The cost of the discs and additional labor subtracts substantially from the savings of rework costs.

Referring to FIG. 3, a flat end encased meat product 71 includes a casing holding system 73 formed at each end of the product. Holding System 73 (one end being shown) eliminates most of the cost of gathered casing and clips, and more than compensates for the cost of a flat end disc 75 which is used at each end of the product. Disc 75 is inserted into a tubular cylindrical casing 77 and the plane of disc 75 is oriented at right angles to the casing axis 79. Disc 75 is circular in shape and includes a flat inner surface 88. Disc 75 may be made from tin plated steel or other rigid materials, as for example, plastic. Disc 75 may also be oval shaped, rectangular, etc. depending on the cross-sectional shape of product 71.

Disc 75 is located near the end of the casing, generally indicated by reference numeral 81. Casing end 81 is stretched in diameter and drawn tightly over the circumferential edge of disc 75. The outer end edge 83 of casing 77 is unsupported and therefore remains or contracts to or near its original unstretched diameter. A terminal portion 85 of the casing end is located between end edge 83 and the circumferential edge of disc 75. Terminal portion 85 of the casing is bonded onto the outer surface 87 of the disc. The bonding of the terminal portion 85 to the outer surface of disc 75 holds the casing in a state of axial and radial tension when casing 77 is stuffed under pressure by an emulsion pump (not shown).

Referring to FIG. 4, flat end system 73 is shown in more detail and FIG. 4 shows an adhesive layer 89 which holds the terminal portion 85 of casing 77 to the outer surface 87 of disc 75. The portion of the outer surface 87 beneath terminal portion 85 is referred to herein as the peripheral boundary 84. Adhesive layer 89 may be formed from fast setting adhesives such as temperature resistant cyanoacrylate or heat sealing adhesives. The preferred adhesive is heat sealable saran which is described in U.S. Pat. No. 4,610,742. The saran adhesive has adequate strength at cooking temperatures and is resistant to hot water and animal fats. The saran adhesive is also FDA approved for direct contact with food.

The bonding surfaces of the end plates, disc 75, are preferably precoated with the adhesive. Heating of the adhesive may be carried out by contact with heated forms that fit the surfaces. Alternatively, the heating may be carried out by electronically heating the metal surface in the area of the bond or by electromagnetically heating the metal surfaces in the area of the bond or heating adhesives containing magnetically responsive particles.

It should be noted that precoating of the bonding surfaces on the end plates with adhesive is especially suitable for disposable end plates. It thereby avoids the need for meat processors to recoat the bonding surfaces with adhesives, as would be required for reusable end plates.

The food product which is pumped into the casing provides an axial force f1 against the inner surface 88 of disc 75 tending to force disc 75 outwardly away from casing 77. In addition, the food product provides a radial or peripheral force f2 against the casing tending to expand the diameter or peripheral boundary of the casing. The holding of the terminal portion against the outer surface 87 of the disc by adhesive 89 serves to couple the axially outward force f1 of the food product with the axial tension f3 of the casing. Adhesive 89 prevents the terminal portion 85 of the casing from being pulled back over the peripheral edge of disc 75. Adhesive 89 is located within the peripheral boundary of the disc such that casing overhanging the end plate can be most effectively bonded.

Referring to FIG. 5, a holding system 73' includes an adhesive layer 89 which secures casing 77 to disc 75. A metal cylindrical member 93 is integrally formed at the peripheral edge of disc 75. Metal members 93 extends outwardly and normal to disc 75 along its outer periphery as shown, and includes a casing confronting side surface 90. Adhesive layer 89 attaches the terminal portion 85 of casing 77 to the side surface 90 of metal member 93.

The holding system of FIG. 5, however, is limited to use for product that does not require high internal pressure and temperatures, such as uncooked dry sausage. It is a known characteristic of adhesive bonds that they tend to fail when one substrate stretches under load and the other does not follow. Stretching under this condition concentrates the load at the edge of the bond and causes progressive failure. The holding systems of FIG. 3, 4, and 6 are significantly less susceptible to stretch induced bond failure because of friction induced by the sharp downturn of the casing over the edge of the end plate disc. It has been found that even rounding the edge reduces the effectiveness of the downturn.

Referring to FIG. 6, a holding system 73'' includes an adhesive layer 89 which holds the terminal portion 85 of casing 77 to disc 75. Similar to FIG. 5, a metal cylindrical member 93 is integrally formed at the peripheral edge of disc 75. Casing terminal portion 85 is drawn over an outer edge surface 95 of metal member 93 and back inwardly along inside surface 97 of metal member 93, as shown. Adhesive layer 89 may be generally L-shaped being positioned against outer edge surface 95 and inside surface 97 for holding casing terminal portion 85 onto metal member 93. As will suggest itself, shapes of the adhesive other than L-shaped may be used, and adhesive layer 89 may be disposed only on surface 97.

Member 93 may be flared outwardly, at a small obtuse angle relative to the longitudinal axis of the product rather than being located normal to outer surface 87 of disc 75. This provides a nesting of adjacent discs prior to implantation, for shipment, storage or location in the stuffing machine magazine. With the holding system 73'' of FIG. 6, a snubbing action is caused by the terminal portion 85 of the casing being bent around metal member 93, which serves to reduce the stress on adhesive layer 89.

Referring to FIG. 7, a holding system 73''' includes a metal member 93' which is integrally formed at the outer periphery of disc 75. Metal member 93' is formed having a cross-sectional configuration, as shown, which presents an outwardly facing adhesive receiving surface 99 which is normal to the casing axis. Member 93' also provides an outwardly facing annular surface 101 for supporting casing 77. Adhesive 89 holds the terminal portion 85 of the casing onto receiving surface 99.

Referring to FIGS. 8a–8d, a holding system is shown in which a metal member 103 is formed integral to the peripheral edge of disc 75. Metal member 103 includes a small cylindrical offset portion 105 which extends outwardly from and normal to the outer surface 87 of disc 75. Metal member 103 also includes an annular depending portion 107 which extends radially inward from the outer edge 109 of cylindrical portion 105. Depending portion 107 is spaced generally parallel to the outer surface 87 of the disc.

Casing 77 is stretched over disc 75 including the cylindrical offset portion 105 leaving a terminal portion 111 of the casing. Terminal portion 111 is unsupported and therefore returns or attempts to return to its original diameter, as shown in FIG. 8a. As shown in FIG. 8b, the casing end portion 113 of the terminal portion 111 is forced or tucked between the depending portion 107 and the outer surface 87 of disc 75. After the casing end portion 113 is tucked into place, the metal member 103 is forced toward the outer surface of disc 75 clamping the end casing portion 113 against the outer surface 87 of the disc. The clamping action serves to hold the casing relative to the disc.

FIGS. 8c and 8d show a variation of the holding system shown in FIG. 8a. Disc 75 has a curled edge similar to the "can ends" sometimes used for manual insertion into casing for making flat end product with one clipped end.

As shown in FIGS. 9a and 9b, another embodiment is illustrated similar to the embodiment of FIGS. 8a, 8b wherein the end edge 115 of the metal member 103 is curled to provide a smooth curve surface for contact against the casing during clamping. This avoids a sharp clamping edge and improves the holding ability of the metal member 103.

Figure 10B:
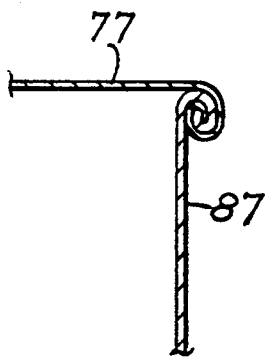

FIGS. 10a and 10b show another variation of the clamping structures shown in FIGS. 8a–8d, 9a and 9b. A metal member 117 is formed integral to the peripheral edge of disc 75. Metal member 117 has a curled cross sectional configuration as shown and is continuous around the full extent of the peripheral edge of disc 75. The end 119 of the terminal portion of the casing is tucked behind the curl-shaped metal member 117 as shown in FIG. 10b. Thereafter, the curl-shaped metal member 117 is flattened for clamping the terminal end 119 of the casing against the outer surface 87 of the disc 75.

Figure 11A:
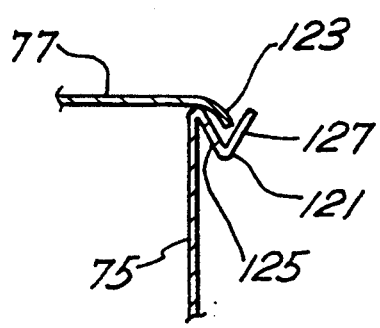
Figure 11B:
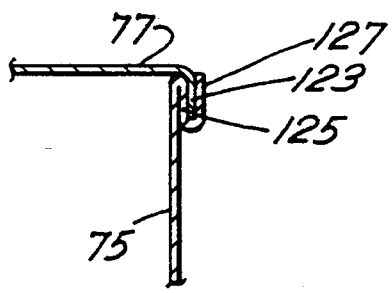

As shown in FIG. 11a, a metal member 121 is formed integral to the peripheral edge of disc 75. Metal member 121 includes two leg portions 125, 127 disposed in a generally V-shaped cross sectional configuration, as shown, and that are continuous in length around the full extent of the peripheral edge of disc 75. The end 123 of the terminal portion of the casing 77 is pulled over disc 75 and then inserted into the open V-shaped mouth of the metal member 121 between leg portions 125, 127, as shown in FIG. 11a. Thereafter, metal member 121 is flattened so as to close the opening of the V-shaped mouth, as shown in FIG. 11b, to extent that the two leg portions 125, 127 of the V-shaped configuration are clamped together grasping the terminal end 123 of the casing therebetween. This serves to grip the casing preventing its removal from disc 75.

Figure 12A:
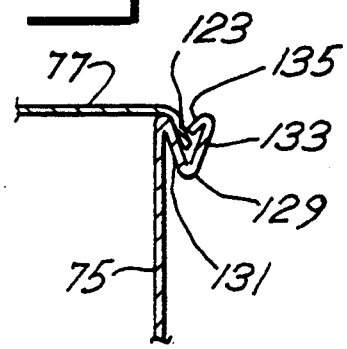
Figure 12B:
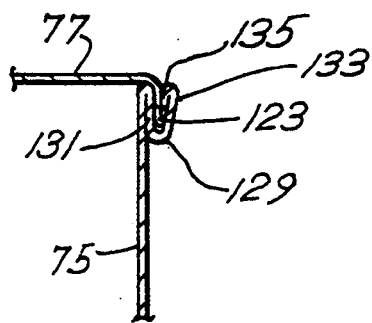

Referring to FIG. 12a, a metal member 129 is secured to the peripheral edge of disc 75. Metal member 129 includes three separate leg portions, 131, 133, and 135. Legs 131, 133 are connected in a V-shape configuration similar to that shown in FIG. 11. Leg 135 extends from the terminal end of leg 133 inwardly toward the open area of the V mouth formed by legs 131, 133. The terminal end 123 of casing 77 is pulled over disc 75 and inserted into the V mouth formed by legs 131, 133. The terminal end 123 of the casing is inserted within the V mouth to a position radially inward of the terminal end of leg 135. After the casing end 137 is in position, the metal member 129 is flattened together serving to hold the terminal portion of the casing 77 relative to disc 75 as in FIG. 12b.

Figure 13A:
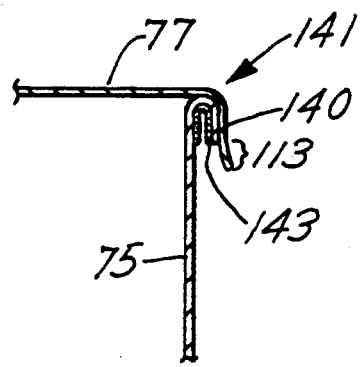
FIGS. 13A-B, 14A-B, and 15A-B are partial cross sectional side views of various joint systems that combine adhesive bonding with clamping of the terminal end of a casing to a flat end unit.
Figure 13B:
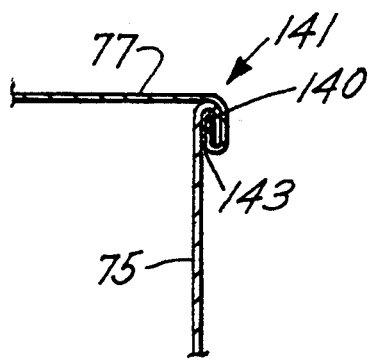

Referring to FIGS. 13a and 13b, a metal member 140 similar to that shown in FIG. 8a is secured to the outer peripheral edge of disc 75. The casing 77 is pulled over disc 75 leaving a terminal end 113, as shown in FIG. 13a. An adhesive layer 143 is located between metal member 140 and the outer surface of disc 75. The terminal end 113 of casing 77 is tucked between the layers of adhesive 143 and thereafter metal member 140 is flattened in order to clamp the casing end relative to disc 75. This combination of both clamping and adhesion tends to supplement one another. Whereas a clamping structure may tend to slip in some instances, the adhesion layer may require longer cure time prior to moving of the product. In addition, adhesion may fail progressively due to the stretchability of the casing. Clamping can lend its force where needed to reduce stretchability affects.

Figure 14A:
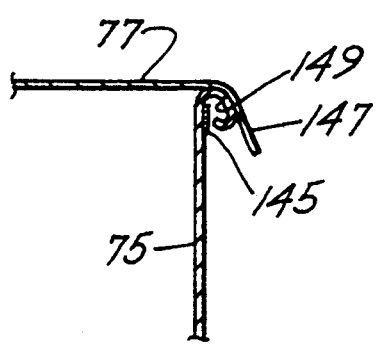
Figure 14B:
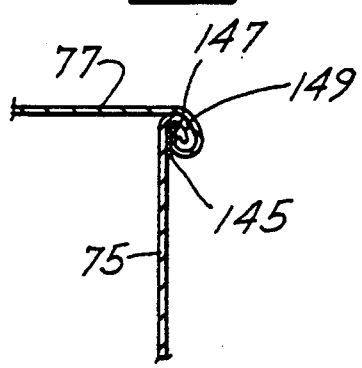
Figure 15A:
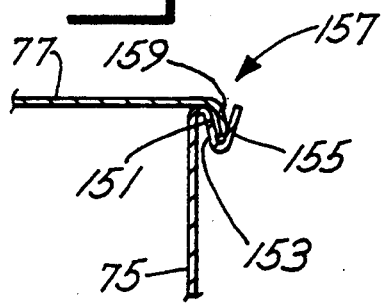

Likewise, an adhesive layer may be provided with respect to the clamping structures variations of FIGS. 9–12. More particularly, FIGS. 14 and 15 illustrate the use of such adhesive layers. As shown in FIG. 14, an adhesive layer 145 is located at the outer peripheral edge of disc 75. The terminal end 147 of the casing is tucked between the metal member 149 and the adhesive layer 145 prior to flattening of metal member 149.

Figure 15B:
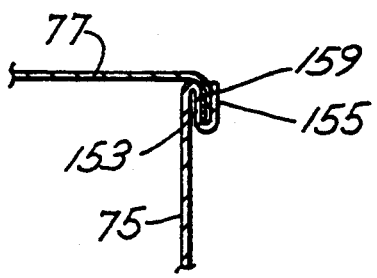

As shown in FIG. 15, an adhesive layer 151 is located on both leg portions 153, 155 of a V-shaped cross-sectional configuration of a metal member 157. After the casing end 159 is positioned within the V mouth of metal member 157, legs 153, 155 are flattened together as shown in FIG. 15b.

Figure 16:
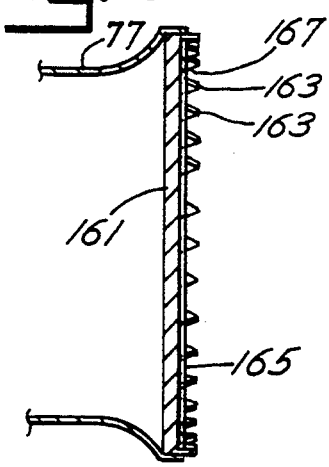
FIG. 16 is a cross sectional side view of a flat end unit which holds the terminal end of the casing by means of piercing pins formed at the periphery of the flat end plate.
Figure 17:
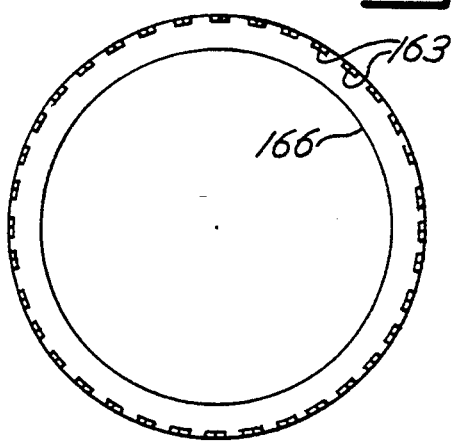
FIG. 17 is a front view of the flat end unit of FIG. 16.

Referring to FIGS. 16 and 17, a flat end disc 161 includes a plurality of piercing members or pins 163 which are disposed for facing outwardly from the disc 161. The piercing members are equally spaced around the outer most radial circumference of disc 161 as shown in. FIG. 17. Casing 77 is stretched over the edge of disc 161 to an extent so as to provide a terminal portion 167 of casing 77. Portion 167 is pierced by piercing pins 163 and retracts to its original diameter 166 as shown in FIG. 17.

Figure 18:
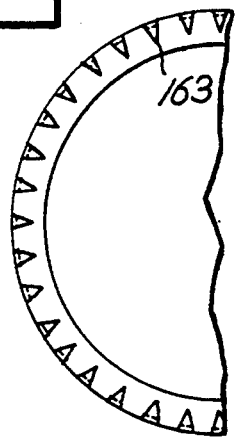
FIG. 18 is a front end view of the flat end unit of FIG. 17 with its piercing pins bent radially inward.

As shown in FIG. 18, piercing pins 163 may be bent radially inward for operator safety. Further, they may be bent flat against the terminal portion of the casing for assisting in a mechanical holding of casing 77 relative to disc 161.

Figure 19:
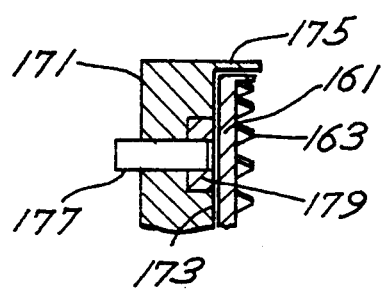
FIG. 19 is a partial side cross-sectional view of a sizing disc for permitting ease of assembly of the casing to the flat end unit of FIG. 16.

Referring to FIG. 19, a sizing member 171 may be used to avoid premature engagement of piercing pins 163 with the terminal portion of the casing. Disc 161 is positioned within a holding aperture 173 of the sizing member 171. An extending lip 175 extends axially outward to a position further extended than piercing pins 163. The casing 77 is pulled over sizing member 171 and the terminal portion of the casing is stretched over lip 175 and permitted to extend radially inwardly to its original diameter. The terminal portion of the casing will be spaced adjacent to points 163 but will not be in contact with the pins.

An ejection member 177 is pushed in order to move disc 161 out of its holding aperture 173 for causing points 163 to pierce the terminal portion of the casing. A magnet 179 may be used to hold disc 161 within its receiving aperture 173 until ejection member 177 is actuated. When stuffing begins, meat pressure against disc 161 will push the disc forward, separating it from sizing disc 171. The casing will move over sizing disc 171 until stuffing is complete.

The use of piercing pin members which are ⅛ inch in length and spaced apart by ¼ inch were found to hold an equivalent of 4 PSI internal casing pressure when the casing was moist but unheated. In order to increase the holding capability without the decreasing the piercing capability, smaller, shorter pins may be incorporated between larger pins. Such a system provides a two stage piercing action for ease of piercing. It was found that this raised the holding capability to the equivalent of 6–9 PSI without bending the pins. The easy piercing with alternative pin lengths permits reduced sharpness, so bending was not necessary for safety. This permits reuse of the end plates upon washing and provides substantial operating cost reductions.

Figure 20:
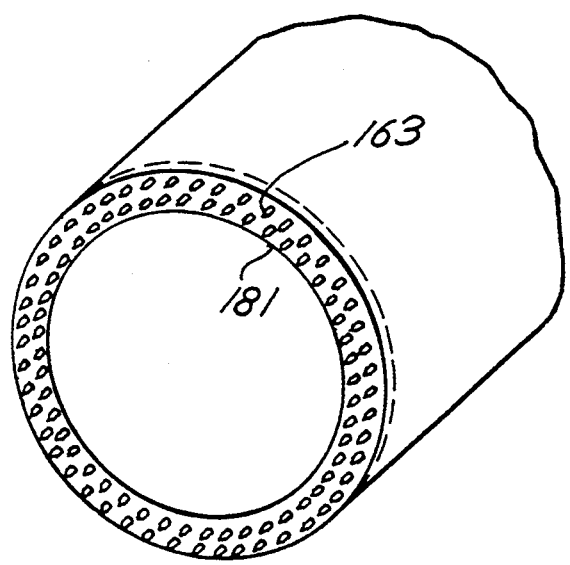
FIG. 20 is a perspective view of a flat end unit bearing two circular rows of piercing pins.

Referring to FIG. 20, a second row of piercing pins 181 may be positioned on the outer surface of disc 161.

The second circular row of pins 181 is located at a radial circumference smaller than the first row of piercing pins 163. In addition, the outer row of pins is located radially inward from the periphery of disc 161. This has the effect of gaining some snubbing effect that adds to the holding ability of these and other types of pins. The pins 181 of the second row are staggered relative to the pins 163 in the first row. It has been found that the second row of pins increases the holding capacity to 6 or 7 PSI. Pins shown are round, but could be of other shapes without departing from the two row concept. FIG. 21 shows piercing pins shaped as truncated triangles.

As shown in FIG. 21, disc 75 includes a single row of truncated triangular pins 183 although two rows may be used and are preferred. A frontal view of triangular pins 183 is illustrated in FIG. 22. As shown in FIGS. 23 and 24, casing 77 is stretched over the edge of disc 75. The terminal portion 185 of casing 77 is permitted to retract to its original diameter. The terminal portion is pressed against triangular pins 183 which pierce the casing so as to hold the casing relative to disc 75. It has been found that the triangular profile cuts out a 4-sided hole having a slit along three sides with the fourth side remaining uncut and attached to the casing. Thus, no debris occurs.

As shown in FIG. 25, a backup ring 187 and a casing bump ring 189, comprised of a rigid metal ring 191 and an elastomer contact ring 193, may be utilized to carry out the piercing action of pins 183 through the terminal portion 185 of casing 77. It has been found that a substantial impact force is required to achieve consistent piercing.

The term "flat", describing an end plate is used broadly. True-flatness can ideally eliminate reworking of the first slice. This is desirable but is not a necessity.

The flat end plates of FIGS. 20-25 are preferably reusable upon washing and are preferably made of durable plastic. A preferred plastic for the product to be cooked while under the pressure of fibrous casing at maximum diameter is polysulfone or related plastics. Such plastics have adequate bending strength at 200° F., are resistant to hydrolysis, animal fats, alkaline washing solutions, crazing, and have reasonable impact value and wear resistance. Such plastics are readily moldable and cost affordable. Other plastics with comparable properties should be acceptable.

Stainless steel end plates made as per FIGS. 16-19 would be a second choice for reusable service.

Tin plated steel would be preferred for disposable service as in FIGS. 3-15. Tin plated steel end plates could also be made with piercing pins as in FIGS. 16-19.

Referring to FIG. 26, a casing 201 includes tension bands 203 which are preapplied to the end zones 205 of the casing 201. The particulars of this casing structure are set forth in the U.S. patent application Ser. No. 07/714,189, filed Jun. 12, 1991, referred to above.

Referring to FIG. 27, a flat end plate, shown by broken line, 207 is positioned in the end zone 205 of casing 201 adjacent to tension band 203, and serves to expand the casing enlarging its diameter. Terminal portion 208 of the casing 201 is held against the outer side of disc 207 against the axial tension of the expanded casing as the food product is forced against the inner side of disc 207. Tension band 203 prevents the terminal end 211 of the casing from stretching to the diameter of flat end plate 207 caused by the force of the food product against the inner surface of the flat end plate 207. As shown in FIGS. 28 and 29, during the application of heat, tension band 203 will flatten against the backside of disc 207 due to the yielding of the band edge nearest to the disc because that edge initially carries the concentrated load of the meat pressure force on the disc. As that band edge stretches and moves toward the periphery, it pulls the rest of the band after it and the entire band width becomes flat against the flat end plate, provided the band strength and width are appropriately selected.

A tension band 203 may be used which comprises two layers of fibrous casing or film strips. The layers may be oriented to provide more stretchability. One of the layers, the inner layer, is directly bonded to the tubular casing in an orientation to provide the most stretchability. The other layer, the outer layer is bonded to the first band layer and in an orientation to provide less stretchability than the first layer. A saran hot melt adhesive is used to bond the assembly together. The two layers add strength. The film orientation arrangement adds stretchability as well as strength.

Fibrous casing stretchability is greatly influenced by moisture content. The inner layer is not significantly exposed to moisture, so it requires a long period of exposure to moisture to gain sufficient stretchability. Moisture exposure can be enhanced by making the inner layer wider than the outer. The greater width of the inner layer exposes an area of the inner layer (an area that is not covered with saran) to readily absorb moisture. This moisture is transmitted across the inner band width.

Various apparatus and methods may be used to make the food product with the particular holding systems described above. For example, U.S. patent application, Ser. No. 07/714,189, referred to above discloses apparatus and a sequence of steps which may be performed in preparing dimensionally uniform stuffed meat products with flat ends, using the holding system of the present FIGS. 26-29.

Figure 30:
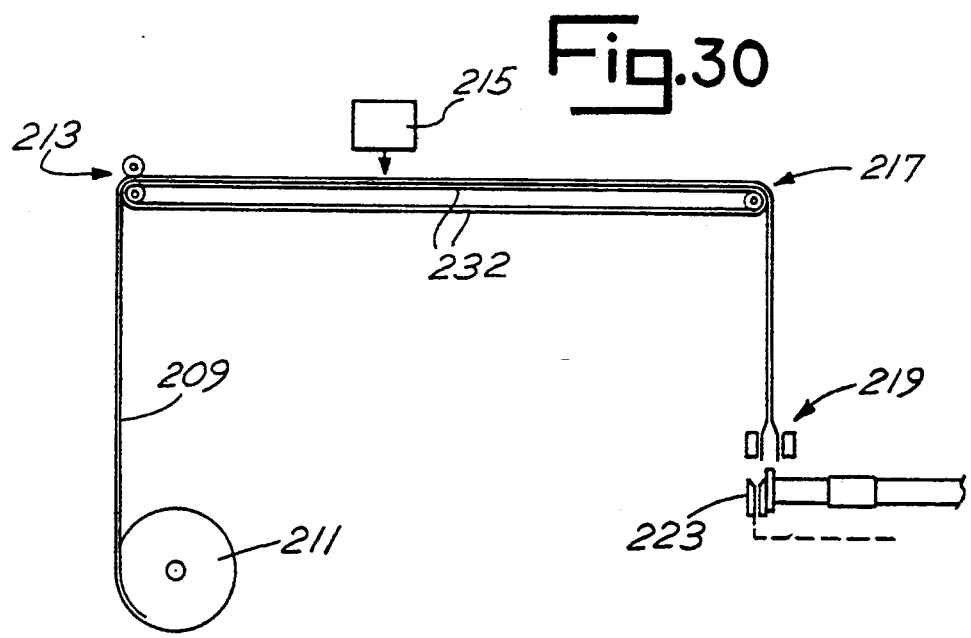
FIG. 30 is a schematic view of steps in a stuffing procedure.

Referring to FIG. 30, a length of flat casing 209 is pulled and severed from a continuous casing supply reel 211. As schematically represented in FIG. 30, casing 209 travels vertically upward from reel 211 to a pair of driving rollers 213. Rollers 213 feed the casing horizontally with the casing being supported by a conveying belt 232. A moveable cutter 215 is positioned above casing 209 and is operable for cutting the casing into individual measured lengths for subsequent stuffing. Conveying belt 232 continues the horizontal movement of the cut casing length to a turning roll 217 which feeds the casing vertically downward to a casing opener 219 upon which cutter 215 is activated. A clear plastic enclosure (not shown) may be used to enclose all or part of the apparatus of FIG. 30 in order to reduce moisture loss to ambient air that would reduce casing stretchability.

Figure 31:
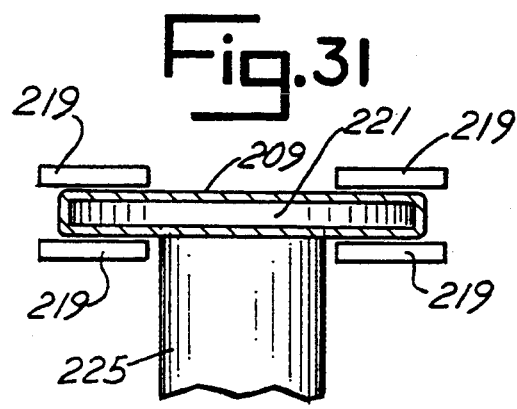
FIG. 31 is a detailed top view of a portion of FIG. 30.

Referring to FIG. 31, casing opener 219 utilizes vacuum on the outside surface of casing 209 to spread the flat casing apart so as to open the casing for movement onto a sizing disc 221, somewhat similar to sizing disc 171 of FIG. 19.

Figure 33:
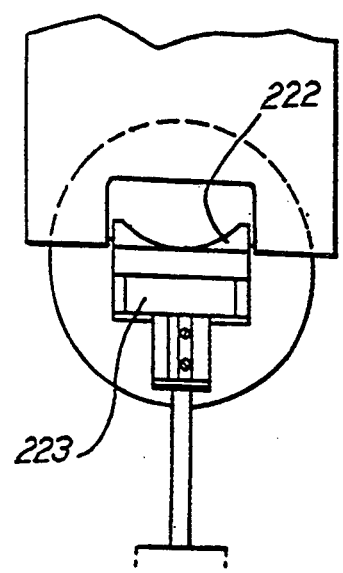
FIG. 33 is a front view of FIG. 32.
Figure 32:
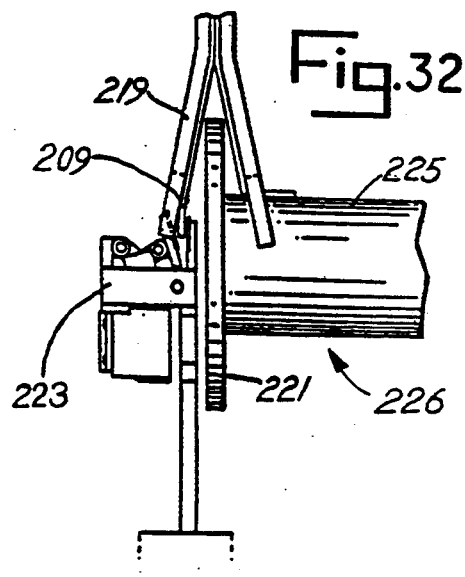

Referring to FIGS. 32 and 33, a casing puller 223 receives the edge of the casing located on the forward plane of sizing disc 221 and pulls the forward casing edge downward and then beneath the lowest edge of sizing disc 221. The casing puller continues its movement of the forward end of the casing along the outer sleeve 225 of the stuffing horn assembly 226, as indicated by the dotted line in FIG. 30. Casing puller 223 may grip the casing edge in a number of ways including the use of a mechanical gripping member 222.

Referring to FIGS. 34 and 36, two high friction elastomeric shirring rolls 227 engage the casing after it has been moved into position and released by puller 223. Shirring collar 246 has low friction surfaces inclined or configured to fit the contour of the rolls. It is moved forward by sleeve 247 to press the casing against the rolls 227. This moves the casing in an aft direction along the outer sleeves 225 and 247 of the stuffing horn assembly. The forward edge end of the casing is drawn through shirring rolls 227 and onto sleeve 247 to form multiple low density soft casing pleats. Although the casing on the upper side of sleeve 225 is severely bunched together as shirring begins, the bunching disappears and the casing becomes centered on the sizing disc. The casing is pulled over the sizing disc until a terminal end portion 229 remains (FIG. 36). Thereupon, the shirring rolls are disengaged from the casing.

Referring to FIG. 35, sizing disc 221 has a slot 232 in the upper half of its rim for insertion of end plate 75. Plate 75 is made of ⅛ inch thick polysulphone plastic and has two concentric rows of triangular pins for holding the casing. End plate 75 is automatically removed from a feed magazine (not shown) and is placed through slot 232 to rest inside the outer edge 228 of sizing disc 221. This end plate 75 is known as the first end plate.

Sizing disc 221 is fixedly attached to sleeve 225 which is axially moveable relative to a stuffing horn 234. An annular ring push plate 235 is nested within the sizing disc and is attached to an inner cylindrical sleeve 233 which is also axially moveable relative to stuffing horn 234 and relative to sleeve 225. Push plate 235 is moveable for forcing end plate 75 into piercing engagement with the terminal end portion 229 of the casing.

Push plate 235 is faced with a flat ring 236 of 80A Durometer polyurethane and a smaller diameter flat ring 237 of closed cell polyethylene foam. Stuffing horn 234 supports both sleeves 233, 225 and is held stationary.

Where a deformable metal member of the types shown in FIGS. 8a through 15b, is secured to the edge of disc 75, the metal member can be deformed to clamp the casing periphery by action of push plate 235. For this purpose, the elastomeric flat rings 236 and 237 are not used. The push plate deforms the metal member at the edge of the end plate by pushing the metal member against a bump finger assembly 242,2543, 244 (described hereinafter) of a stuffing head 238.

After first end plate 75 is moved into place within sizing disc 221, the casing delivery system of FIGS. 30-34 moves a length of casing into place as shown in FIG. 36. Stuffing head 238 is positioned several inches forward of sizing disc 221, and provides clearance for the casing delivery system of FIGS. 30-34. After casing placement onto the horn assembly, stuffing head 238 interacts with the casing and with end plate 75 so as to secure the casing to the end plate via the two rows of triangular pins.

Stuffing head 238 is roughly rectangular in outer dimensions and supported on two shafts (not shown) that move axially parallel to the axis of stuffing horn 234. The center area of stuffing head 238 is open to provide a clear path for the stuffed product as needed. A slot 239 provides a guide for end plates as they are transferred from the magazine to slot 232 in sizing disc 221.

Stuffing head 238 includes twelve brake fingers 240. Fingers 240 are equally spaced in a circular array and serve to hold the casing onto the sizing disc during stuffing. Each brake finger 240 is radially moveable and carries a braking surface 241 for engagement against the casing as described hereinafter.

Stuffing head 238 includes a plurality of bump fingers 244. Fingers 244 are moveable radially inwardly. Each finger 244 carries a metal ring segment 242 having a 80A Durometer polyurethane pad 243. Bump fingers 244 are used to press the aft terminal end portion 229 of the casing against the triangular pins on the first end plate for attaching the casing to the end plate.

Referring to FIG. 37, push plate 235 is moved forward approximately ⅜ inch and sizing disc 221 moves forward approximately ¼ inch. Bump fingers 244 move radially inward and stuffing head 238 is moved rapidly axially to impact polyurethane pads 243 against the terminal end 229 of the casing to impale it onto the pins of flat end unit 75.

Referring to FIG. 38, bump finger assemblies 242-244 move radially outward. Brake fingers 240 move radially inward pressing brake surfaces 241 with a controlled force against casing 209. The meat pump begins pumping meat emulsion through the stuffing horn 234 and into the casing. The first end plate 75 is pushed forward by the force of the meat emulsion. The casing is pulled over the sizing disc and under the brake fingers 240, as shown in FIG. 38.

Referring to FIG. 39, the meat emulsion pump may be stopped by a sensor (not shown) activated by the product position. Push plate 235 and sizing disc 221 are returned to the original position of FIG. 36. The terminal end of the casing 209 has been stopped and held securely by the brake surfaces 241 (FIG. 39). In retracting from its position in FIG. 38, the push plate creates a temporary low pressure zone in the emulsion that permits a second end plate 75 to be inserted into slot 232 of the sizing disc without emulsion leakage.

End plate 75 must pass through guide 239 and into slot 232 of the sizing disc. Recognizing that precise stopping of the stuffing step is difficult, it is observed that the flat-end plate 75 will push excess casing into the slot, being assisted by the natural tendency of stretched casing to return to its original size.

In FIG. 40, push plate 235 moves the second end plate 75 forward beyond the edge of the sizing disc 221 while brake surfaces 241 continue to firmly hold the end of casing 209. As the second end plate moves forward while the meat emulsion pump is idle a void 245 (FIG. 40) is formed that assists in the separation of end plate 75 from the meat emulsion.

Referring to FIG. 41, bump finger assemblies 242-244 move radially inward, depressing the encased product forward of the peripheral zone of second end plate 75, gripping its edge and the casing 209 with ring segments 242.

Figure 42:
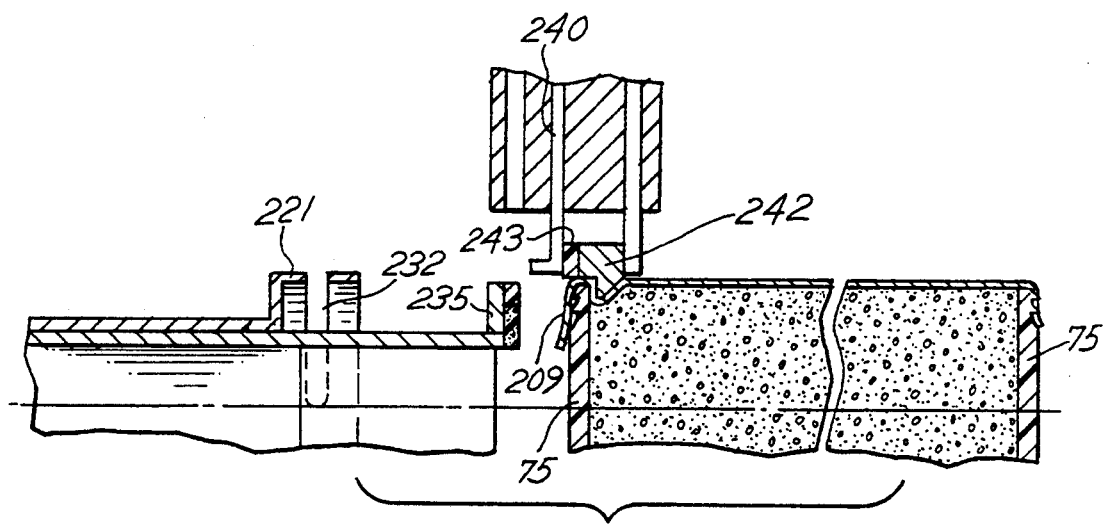

As shown in FIG. 42, brake fingers 240 move radially outward, releasing terminal end of casing 209 from sizing disc 221 and stuffing head 238 moves axially forward. When released from the sizing disc, the radially stretched terminal end of the casing returns toward its original size and is in position to be impaled upon the pins of second end unit 75 when impacted by polyurethane on advancing push plate 235.

Figure 43:
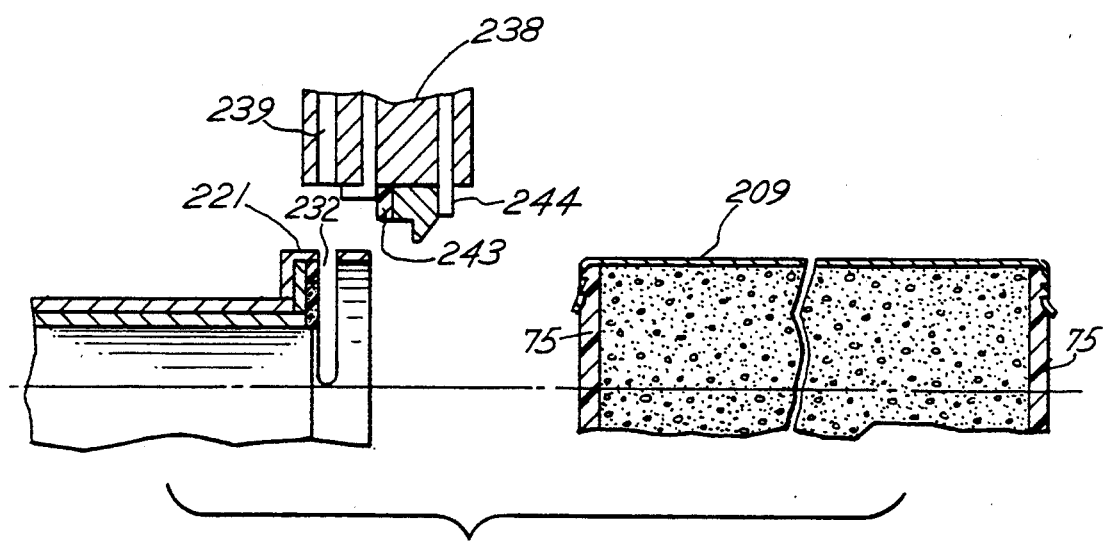

As shown in FIG. 43, the bump fingers 244 have moved radially outward to release second end plate 75 and stuffing head 238 has moved aft to align the end plate guide 239 with slot 232 in sizing disc 221. This completes the cycle and the next cycle begins with the insertion of first end plate 75, as shown in FIG. 35.

Variations in Product Assembly Apparatus of FIGS. 30-43

Figure 44:
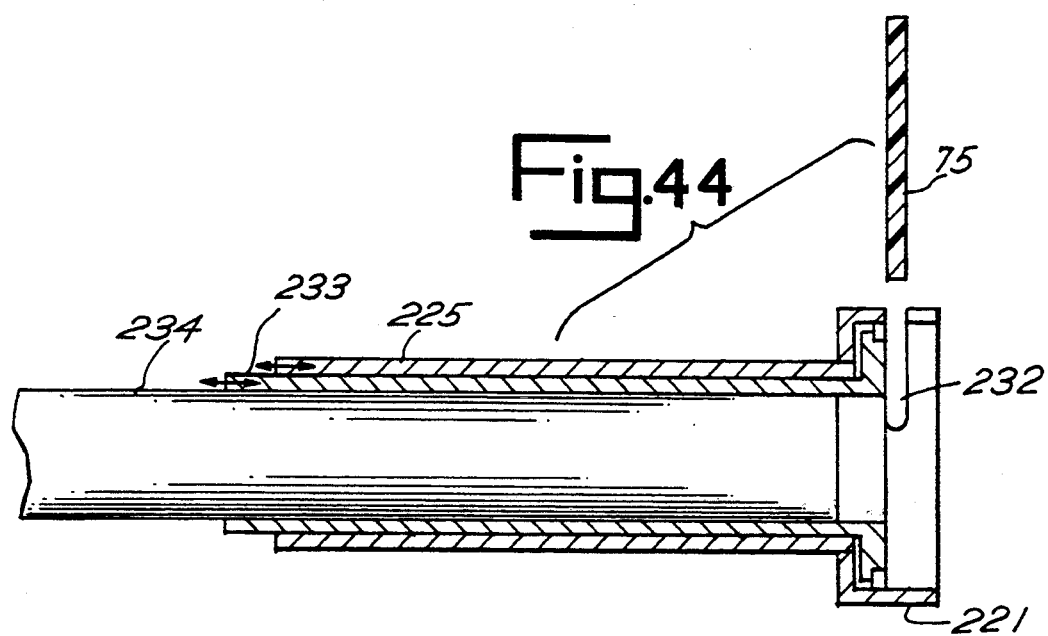
FIGS. 44-53 are additional schematic side views of apparatus and steps for assembling an encased food product with one or more flat ends.

The casing delivery system of FIGS. 30 through 36 may also be used for products with casing reinforcing bands of FIG. 26. Referring to FIG. 44, a flat end plate 75 of plastic, steel or other rigid material is used.

Figure 45:
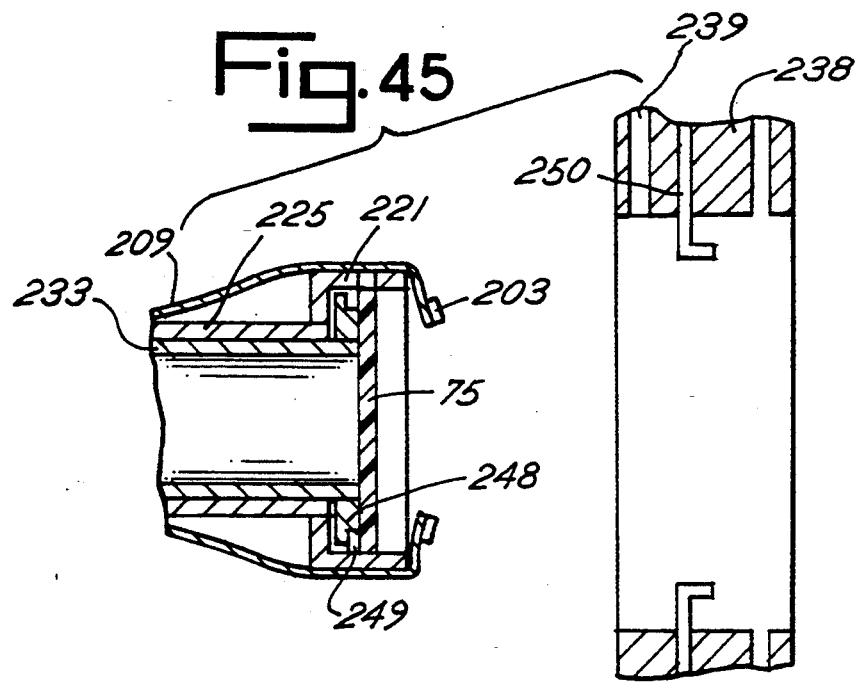
Figure 46:
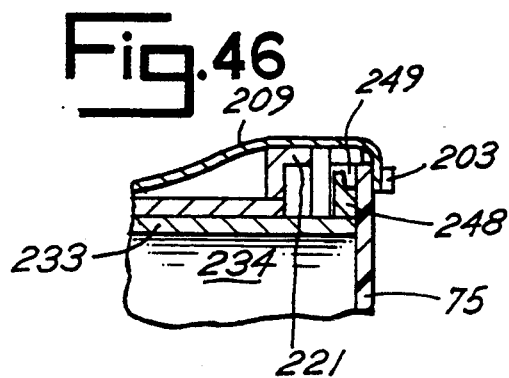

As shown in FIGS. 45-46, push plate 248 has a polyurethane gasket ring 249 (FIG. 46). In FIG. 46, push plate 248 has been moved forward by attached sleeve 233. End plate 75 is now partially forward of the front edge of sizing disc 221. The casing reinforcing band 203 and leading edge of casing 209 are now against the front face of end plate 75.

Figure 47:
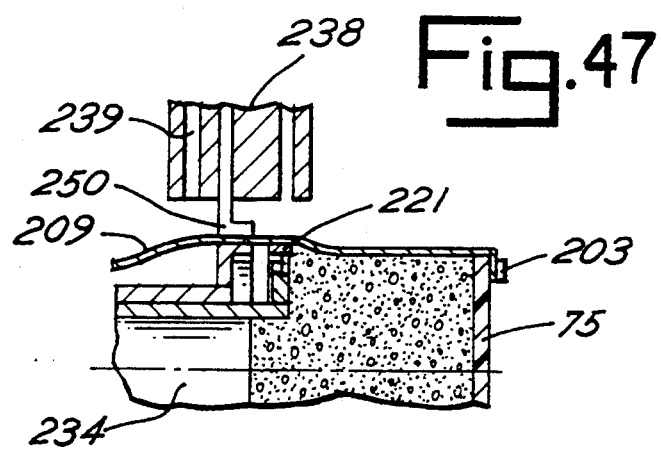

Referring to FIG. 47, the meat emulsion pumped through stuffing horn 234 forces end plate 75 forward and tightens casing reinforcing band 203 and the forward end of casing 209. Brake fingers 250 drag against casing 209 as it is pulled over the sizing disc 221.

Figure 48:
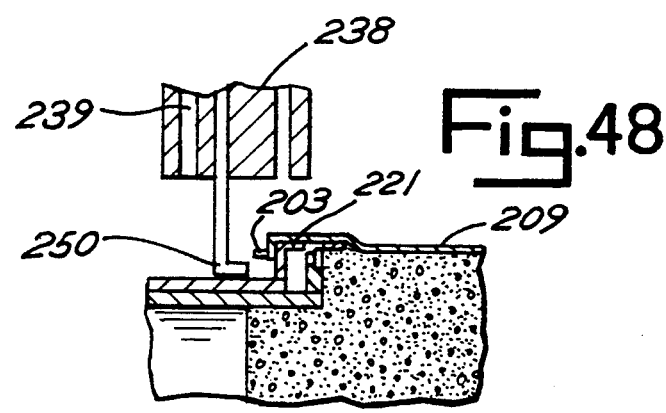

Referring to FIG. 48, when the product is stuffed to proper length and the casing reinforcing band 203 is against the back edge of sizing disc 221 (as determined by a sensor not shown), the flow of emulsion is stopped and sizing disc 221 moves forward relative to stuffng head 238. Brake fingers 250 then move inwardly.

Figure 49:
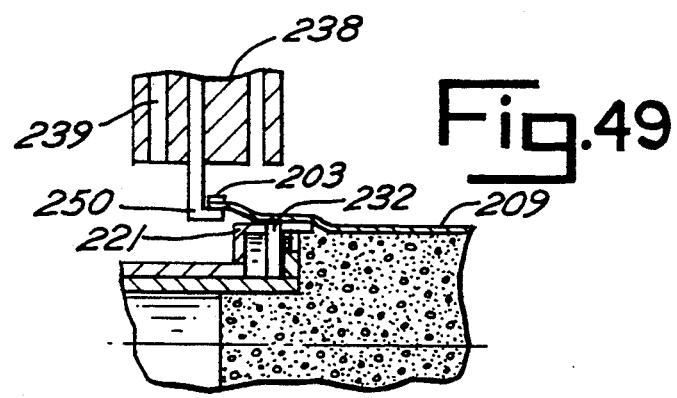

In FIG. 49, sizing disc 221 has moved aft so that casing reinforcing band 203 and the end of casing 209 surround brake fingers 250. The brake fingers are then moved outwardly, stretching the casing reinforcing band and casing enough to slide over the sizing disc.

Figure 50:
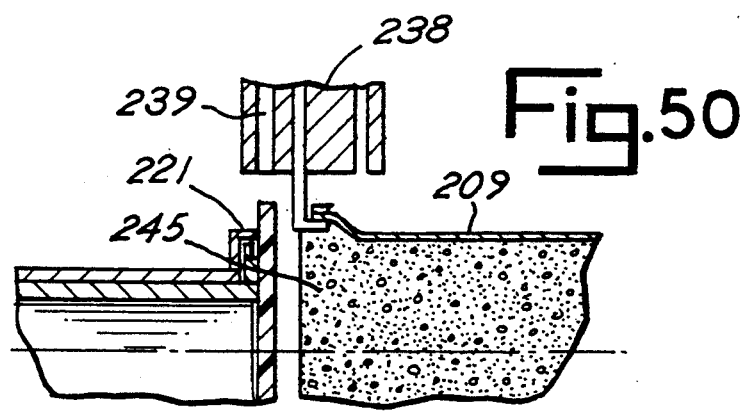

Referring to FIG. 50, the stuffing head 238 is moved forward and sizing disc 221 moved aft. This moves the casing reinforcing band and casing so that slot 232 (FIG. 49) of the sizing disc 221 is uncovered and lined up with end plate guide 239 of the stuffing head. A void or area of low pressure 245 in the emulsion is formed when the push plate 248 (FIG. 49) and sizing disc 221 are moved aft. A second end plate 75 is inserted into the sizing disc through slot 232.

Figure 51:
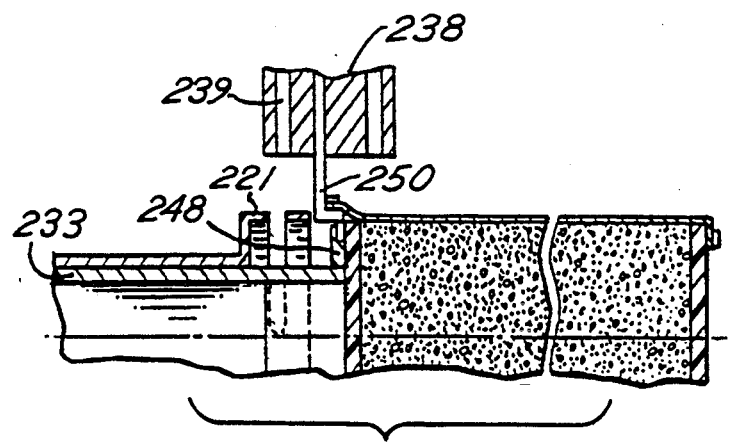

Referring to FIG. 51, push plate 248 and inner sleeve 233 of the stuffing horn assembly move the second end plate into the casing. This allows clearance for the brake fingers 250 to move inwardly to come to rest on the push plate 248.

Figure 52:
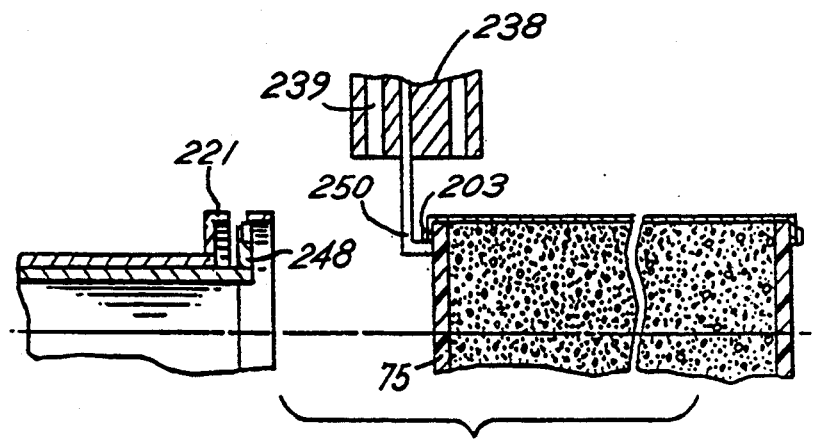

In FIG. 52, the push plate 248 is retracted, allowing the brake fingers and casing reinforcing band to move inward and against the second end plate 75. The stuffing head assembly 238 then moves forward, with the brake fingers 250 pushing the second end plate 75 and the product forward.

Figure 53:
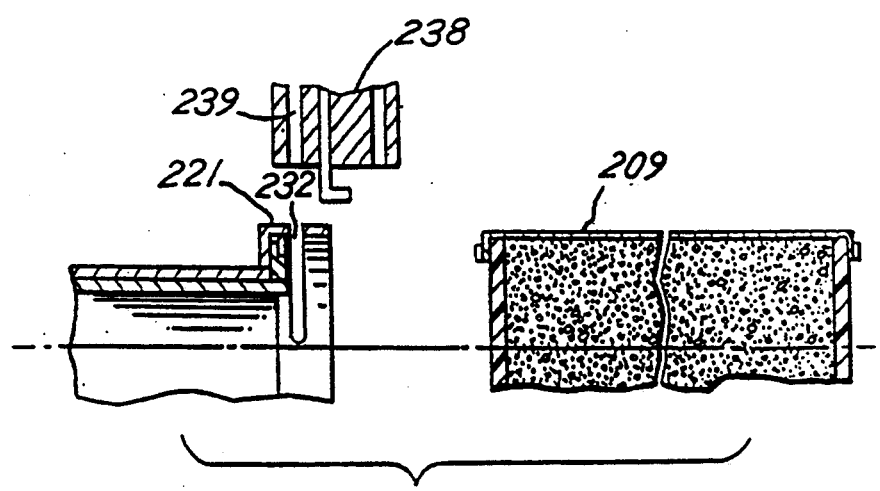

Referring to FIG. 53, the stuffing head assembly 238 moves aft and the sizing disc 221 moves slightly forward to align slot 232 with slot 239. This is the end of the cycle and the next cycle begins with the insertion of a first end plate as in FIG. 44.

Figure 54B:
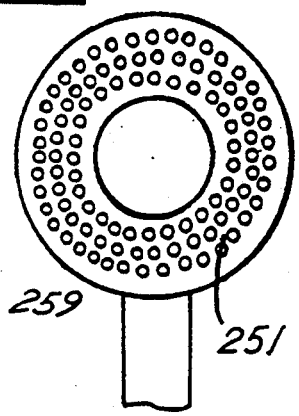
FIGS. 54a-c are apparatus for heat shrink holding of end plates.
Figure 54A:
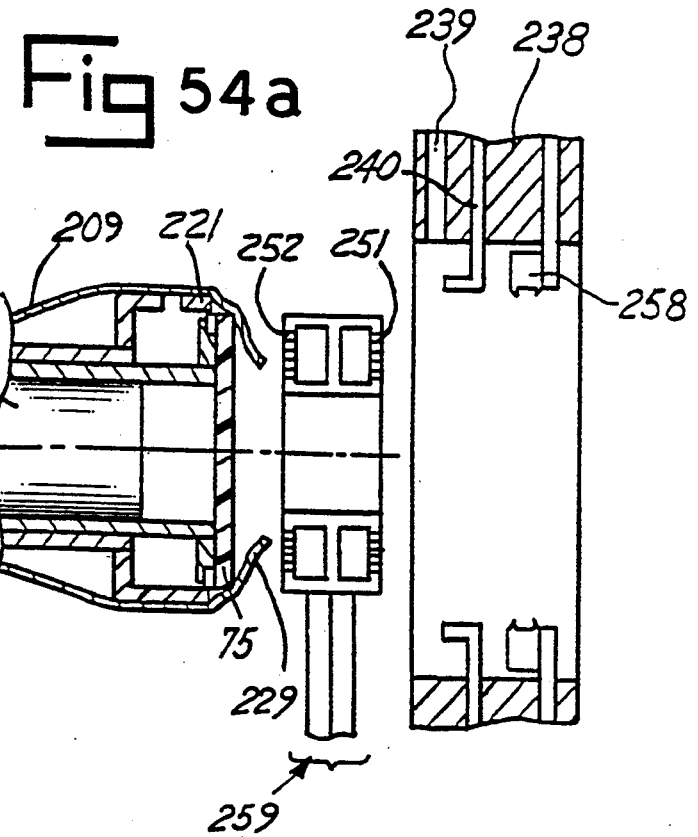
Figure 54C:
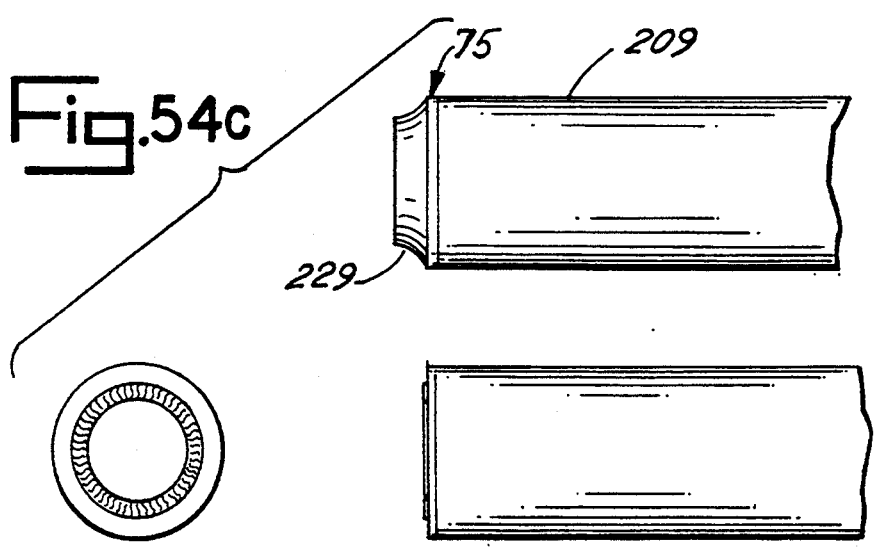

Heat shrinkable plastic casings are used to encase meat for slicing. An example is Optan ® Nylon tubular casing distributed in the U.S. by Brechteen Inc. It has the advantage of preventing rapid moisture loss from encased processed meat. Like other heat shrinkable plastic tubular films used for encasing food for processing, it has sufficient stretchability that it can be drawn over an end plate 75 having a periphery larger than the unstretched periphery 229 of the plastic casing 209 wherein a terminal end portion 229 extends outward beyond the end plate and has a periphery smaller than the end plate as in FIG. 54c. The extending terminal end portion may be held by the various holding means described herein. It can also be held effectively by heat shrinking the outer region of the terminal end portion 229 to the extent that it contracts radially and substantially thickens the outer region as shown in FIG. 54c. The outer film close to the end plate periphery is also decreased radially and is pulled tightly toward the axis 230 of the end plate. In combination, these shrinkage patterns provide effective holding means that hold the end plate in position through the stuffing and cooking cycle.

An air ring as 259 and modifications to fingers as shown in 54a can provide ability to make heat shrink end closures on product in heat shrinkable casing. Hot air ring 259 (shown in end view in FIG. 54b) is retractable in a radial direction and moveable approximately 1" parallel to the axis of stuffing horn 234. Two separately controlled supplies of air feed circular arrays of hot air jets 251 and 252. Aft facing hot air jets 252 are used as shown in FIG. 54 to shrink the terminal end portion 229 of casing 209 against first end plate 75. After stuffing, end plate hold fingers 258 will hold the second end plate and casing while forward facing hot air jets 251 shrink the end portion of casing to complete the product.

Figure 55:
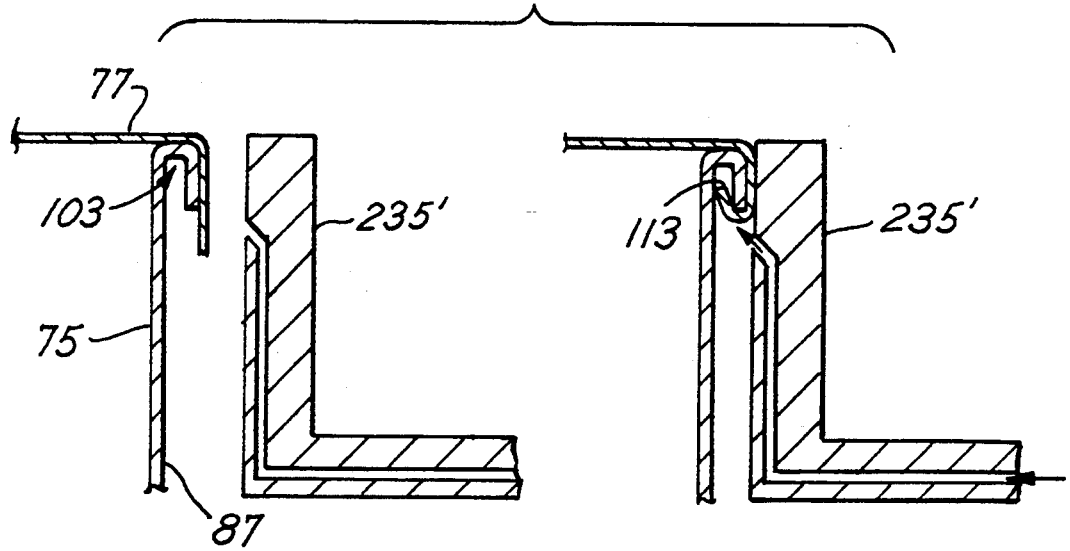
FIGS. 55-56 are compressed air tucking push plates for clamping deformable end plates.

Some of the deformable end plates require that the casing end be tucked under the peripheral lips of the end plates FIGS. 8-10, 13, 14. FIG. 55 shows a pneumatic tucking modification to the FIG. 35 push plate 235. This push plate 235' utilizes the impingement velocity of compressed air to tuck the periphery of the casing into the peripheral lips of the end plates. It is designed for those end plates with fairly broad crevices such as 8a through 8d.

Figure 56:
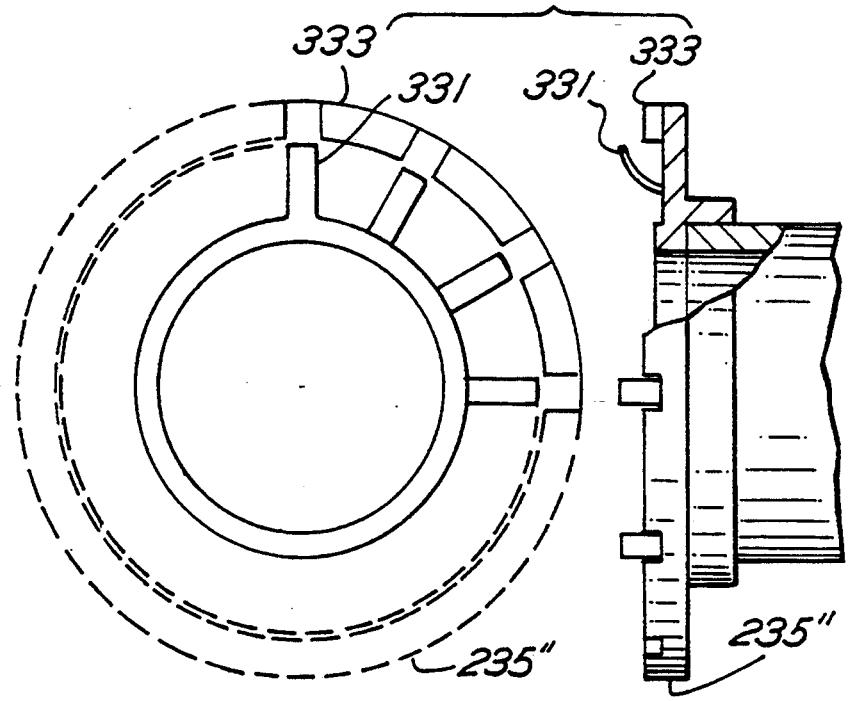

FIG. 56 shows a tucking addition to the push plate for narrower crevices, such as FIG. 9a through 10b and 13a through 14b. This push plate 235" utilizes a rosette of thin leaf springs 331 arranged to expand outward when pushed against the peripheral zone of the end plate that carries the overhanging end of the casing into the crevice under the lip of the end plate. The peripheral zone of the push plate has crenalations 333 arranged to deform the lip of the end plate between the leaf springs and clamp the casing therebetween, The thin leaf springs 331 are not clamped by the crenalations 333 and may be withdrawn.

With the preceding arrangements and minor variations that can be made by those skilled in the art, the deformable end plates may be used with the apparatus and methods shown in FIGS. 30 through 43 for piercing end plates and for other variations of that apparatus. Deformable end plates, FIGS. 11a through 12b and FIGS. 15a through 15b, do not require tucking because of the tendency of stretched casing to seek its original periphery when unsupported. These deformable end plates may also be used with the apparatus and methods of FIGS. 30 through 43 and variations thereof.

End plates for adhesive attachment to casing as in FIGS. 3 through 7 and FIGS. 13 through 15 may be used with the apparatus and method of FIGS. 30 through 43 and variations thereof with the addition of appropriate adhesive activating means as determined by those skilled in the art.

Figure 57:
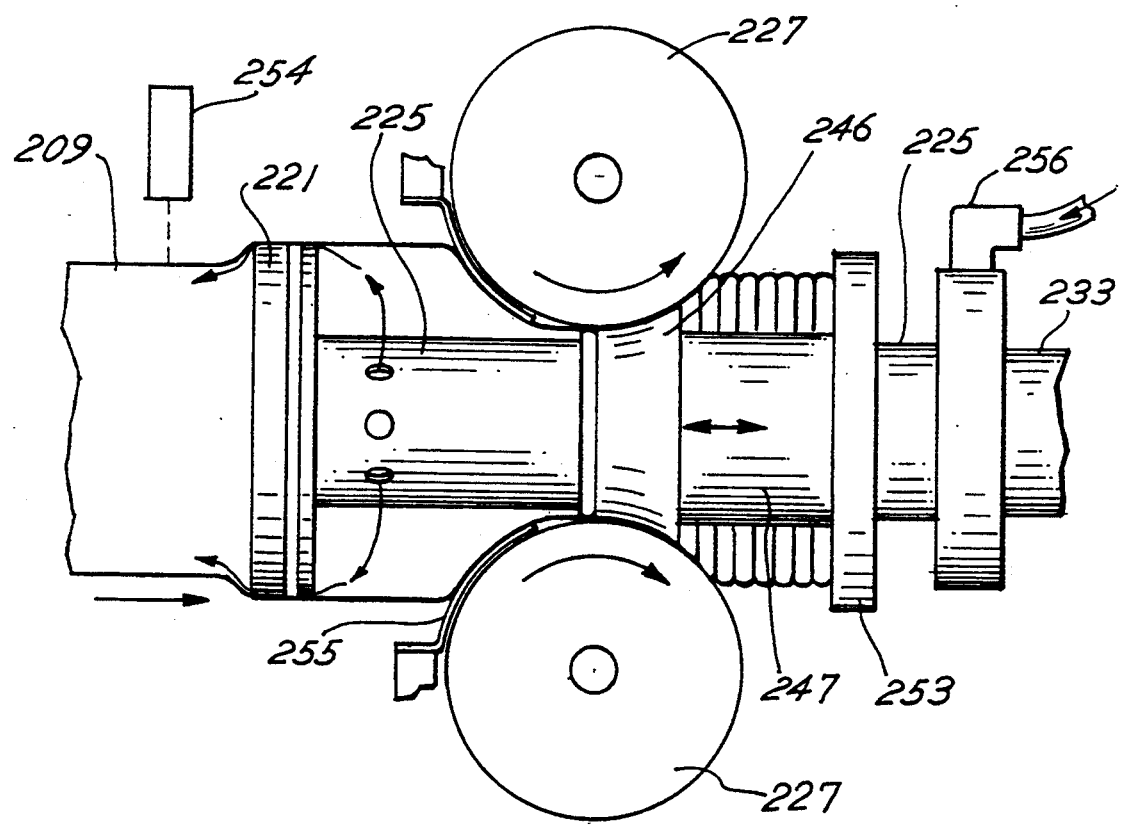
FIG. 57 is a top view of a casing inflation apparatus.

Referring to FIG. 34, it has been found that the high casing tension required to pull casing 209 across the rim of sizing disc 221 causes substantial slippage of the casing with respect to shirring rolls 227. Slippage is irregular, so it is difficult to control the length of the terminal portion of casing extending forward of the sizing disc. This length should be controlled to avoid excessive residual length or inadequate length for holding. Also there may be a tendency of the casing to twist during shirring. Both of these problems are substantially reduced by inflating the casing between the sizing disc and annular seal 253. According to FIG. 57, inflation is achieved with compressed air entering through fitting 256 and flowing through grooves between sizing disc tube 225 and push plate tube 233 into the casing space. Air pressure stretches the casing and lifts it slightly off the rim of the sizing disc, providing a self regulating inflation pressure and minimal friction drag.

Sensor 254 triggers the aft withdrawal of shirring collar 246 which disengages the pulling action of the shirring rolls and stops aft movement of the casing. The sensor also triggers the deflation of the casing. Shields 255 reduce continued contact of the casing with continuing rotation of the rolls during deflation. If necessary, controllable servo motors may be used to bring the rolls to a precise stop. Another alternative would be a brake on the casing at the rim of the sizing disc.

Premoisturizing fibrous casing was developed especially for shirred casing because of difficulties in adding moisture to fibrous casing after it is shirred. In contrast, reeled flat casing may be readily moisturized immediately before stuffing as in U.S. Pat. No. 4,660,254.

Moisturizing dry casing immediately before stuffing permits the use of inherently less expensive casing and allows the user to select optimum moisture levels.

Reinforcing bands are preferably applied to the casing after leaving the dryer and reeler and before premoisturizing to levels of moisture suitable for stuffing. It has been found that peel strengths of the reinforcing bands for the casing, in some instances, can be enhanced by reducing the level of polyol plasticizer in the casing to levels somewhat below those customarily employed in casings. It has further been found that the presence of Kymene, as in U.S. Pat. No. 4,610,742, substantially improves the bond strength, especially when the casing moisture is high. Isocyanate as in U.S. Pat. No. 3,794,515 may also improve bond strength.

Some casing suppliers apply Kymene to their casing on a routine basis to promote ink adhesion. It has been found that Kymene solutions in alcohol may be applied to a localized area of dry casing where they immediately wet the area and quickly penetrate. Surprisingly, the reinforcing bands may be heat sealed in place without waiting for the solution to dry. This provides a commercially practical way to apply reinforcing bands with bonds having excellent wet strength. The Kymene used was 557H made by Hercules Inc. The preferred alcohol tested was 190 proof ethanol, although 91% isopropyl and denatured ethanol also made good bonds.

In using band reinforced casings of this invention, reference may be made to FIGS. 26–29, and 44–53. FIGS. 58–62 illustrate diagrammatically a sequence of steps which may be performed in preparing dimensionally uniform stuffed meat products with flat ends. FIGS. 59 and 60 are top views. The others Figures are side views.

A rigid and essentially flat first end plate 75 is positioned on the forward side of sizing disc 221, both of which are in a tilted plane with respect to the axis of the stuffing horn 234 to permit an opened casing 209 with an oval contour to pass over without obstruction. The end plate is held onto the sizing disc by small spring clips 267. FIG. 58 shows two or more high friction elastomeric shirring rolls 227, preferably with smooth surfaces for greater contact area which engage the casing against a low friction shirring collar 246.

The casing is formed cross-sectionally into an oval configuration by an internal carrier mechanism 265 and 266, known in the art and described in principle in U.S. Pat. No. 3,919,739. Prior art internal carrier mechanisms, however, have been found to be inadequate to transfer the open end of casing across a tilted sizing disc and reliably engage the shirring rolls. FIG. 58 and 59 show four tubular grippers 269, operating on the general principles of retriever grippers, that advance to casing band 203 which is held in position by the aft edge 271 of oval carrier body 266. The grippers grip the band and move aft to the shirring rolls and beyond.

The sizing disc and first end plate 75 are repositioned from a tilted plane (FIGS. 58–59) to a vertical plane (FIG. 60) by means of control rods 268. The aft end of the casing is drawn through the shirring rolls and shirring collar on horn 234 to form multiple low density soft casing pleats 270. FIG. 61 shows circular end plate 75 flush against the forward end of casing 209 and compressed against reinforcing band 203 bonded to the exterior surface of the casing. Shirring continues until the casing end reaches aft edge 271 of the casing carrier 266. At this point squeeze rolls 213 stop while the shirring rolls 227 continue to rotate, causing perforations 272 to break, releasing casing end and band 203. The leading edge of the following casing 209 remains at the leading edge 271 of the casing carrier to await the beginning of the next cycle, while the preceding casing continues to be shirred. When shirring is complete, shirring collar 246 moves aft to provide clearance of the casing to move forward while being stuffed.

Figure 63:
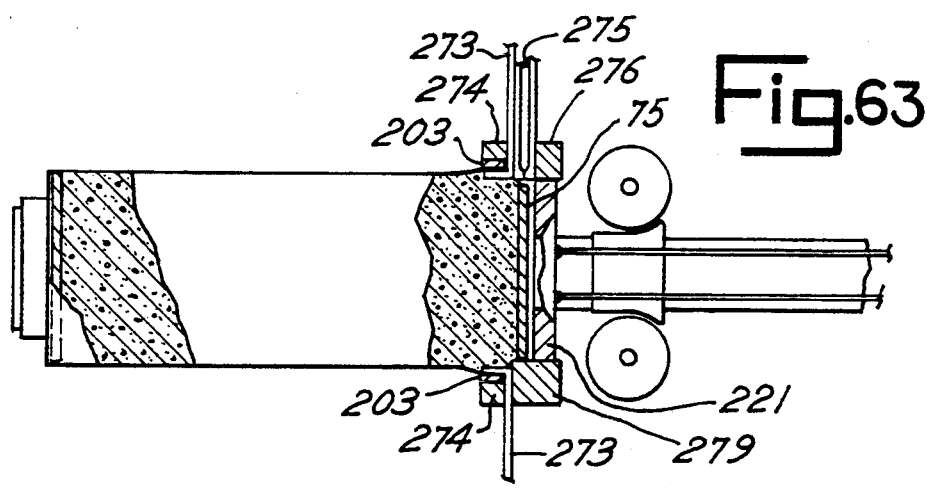
FIGS. 63-65 are schematic cross-sectional side views of apparatus for tension band securing of flat end plates.

The meat pump (not shown) for the stuffing apparatus is then actuated to initiate the stuffing step in order to fill casing 209 with meat emulsion, or other foodstuff. The emulsion pressure pushes the end plate forward off the sizing disc. The stuffing step continues until reinforcing band 203 at the aft end of casing 209 makes contact with the aft side of sizing disc 21 as in FIG. 62. By the sizing disc moving aft, the interior edge of the casing having reinforcing band 203 bonded thereto on the outside surface of the casing, is placed over a set of expandable fingers 273 which then move outwardly to stretch band 203 (FIG. 63). Band 203 is stretched to a diameter which is large enough to permit withdrawal of sizing disc 221 from the aft end of the filled casing (FIG. 63). Expandable fingers 273 are also equipped with elastomeric ring 274 which engages with the outer surface of band 203 to enhance the holding force on the casing, otherwise, axial forces generated during the filling step may cause the casing to be drawn from the fingers. Furthermore, the elastomeric ring helps maintain uniform stretch of the band and helps prevent band breakage between the segments of the expandable fingers.

Figure 64:
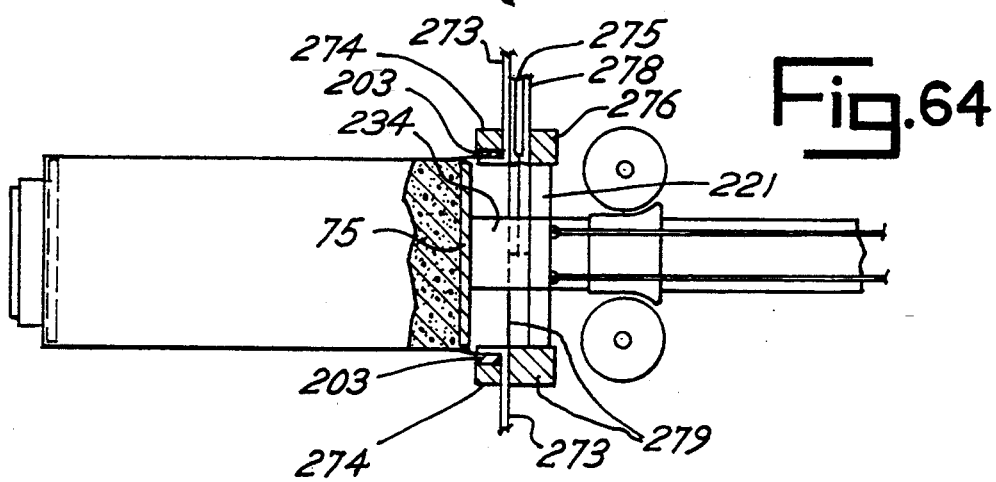
Figure 65:
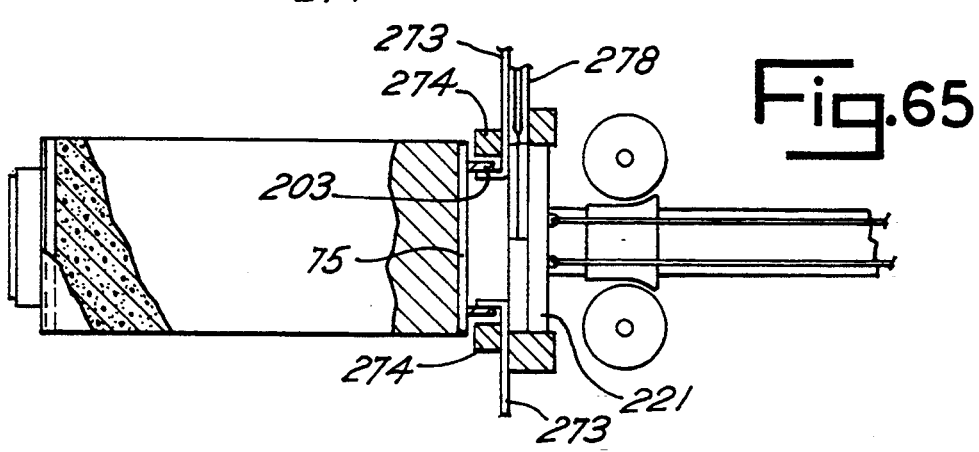

The step shown by FIG. 63 may allow a minor amount of meat emulsion to follow the sizing disk due to pressure exerted by the stretched casing. However, a second end plate 75 is immediately delivered from an end plate magazine (not shown) through normally closed elastomer sealed slot 275 to the forward side of sizing disc 221 scraping the meat from the forward side of the sizing disk. Sealing ring 276/279 define a chamber into which sizing disk 221 retracts, sealing the peripheral edge of sealing ring 276 to prevent meat loss. The upper portion of sealing ring 276 is narrower than the lower portion 279 because the upper portion must accommodate the passage of the end plate through guide slot 275 with its accompanying elastomer lining and the guide wall itself. The greater thickness of the lower portion extends to the axis of the end plate as shown in FIG. 64. It has been found that retraction of sizing disk 221 creates a temporary low pressure zone in the aft end of the encased product due to product viscosity and no significant leakage occurs anywhere in that zone of the apparatus. The product resumes its normal stuffed pressure condition and dimensions when the end plate pushes the meat forward to its original position. Translatable stuffing horn 234 advances (FIG. 64), pushing second circular end plate 75 past expandable fingers 273 and reinforcing band 203, thereby returning any discharged emulsion to the casing and repressurizing the aft end of the filled package. Expandable fingers 273 are then contracted to release reinforcing band 203 (FIG. 65) to form a fully encased self contained sausage product ready for release and further processing, e.g. smoking and cooking. An end plate 75 may then enter guide 278 and join sizing disk 221 in preparation for repeating the cycle.

Figure 66:
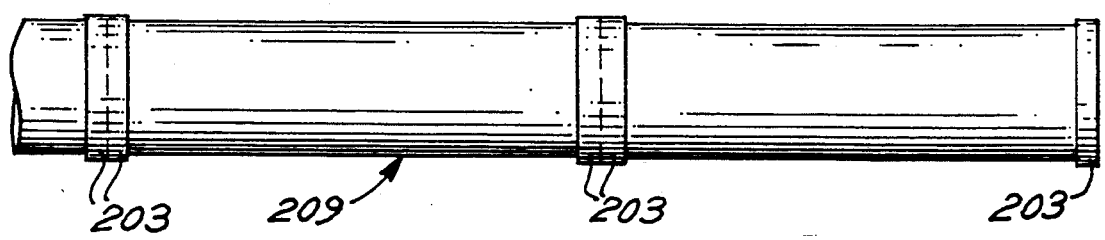
FIG. 66 is tension band reinforced casing for use with the apparatus of FIGS. 63-65.

FIG. 66 shows a continuing length of casing 209 with a band 203 on the open end of casing 209. The other bands 203 are of double width with intermittent slits passing through the double bands and casing so they may be severed reliably by high tensile force exerted by the shirring rolls when a squeeze roll brake is activated.

Although the invention has been described in considerable detail with respect to the preferred embodiments, thereof, it will be apparent that the invention is capable of numerous modifications and variations to those skilled in the art without departing from the spirit and scope of the invention, as defined in the appended claims.

A useful encased food product with only a first flat end and the second end gathered to a round end and clipped is one contemplated embodiment. It would have the advantage of simplifying the stuffing machine although operating savings would be less.

Because the reusable end plates are made of lightweight tough plastic and only ⅛ inch thick or stainless steel 0.032" thick—more or less, the end units may be placed into compact magazines by the person peeling the casing off the product for slicing. Each pair of end plates are placed into the magazine directly after removal from the product. They remain in the collecting magazine through ultrasonic washing, through storage, transport and placement into the stuffing machine for reuse.

Figure 67:
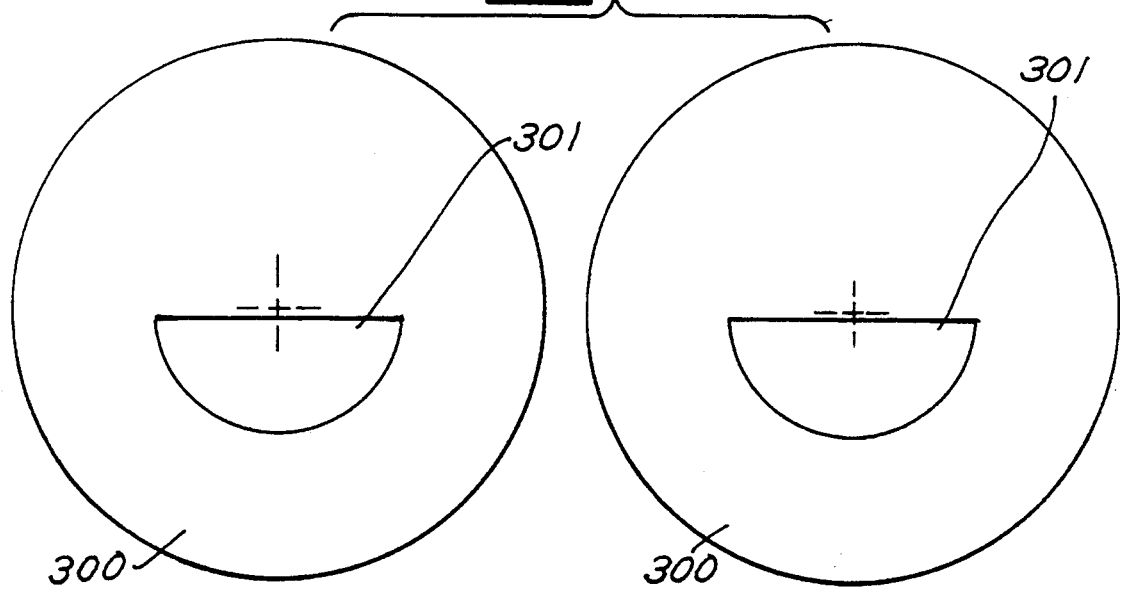
Figure 68:
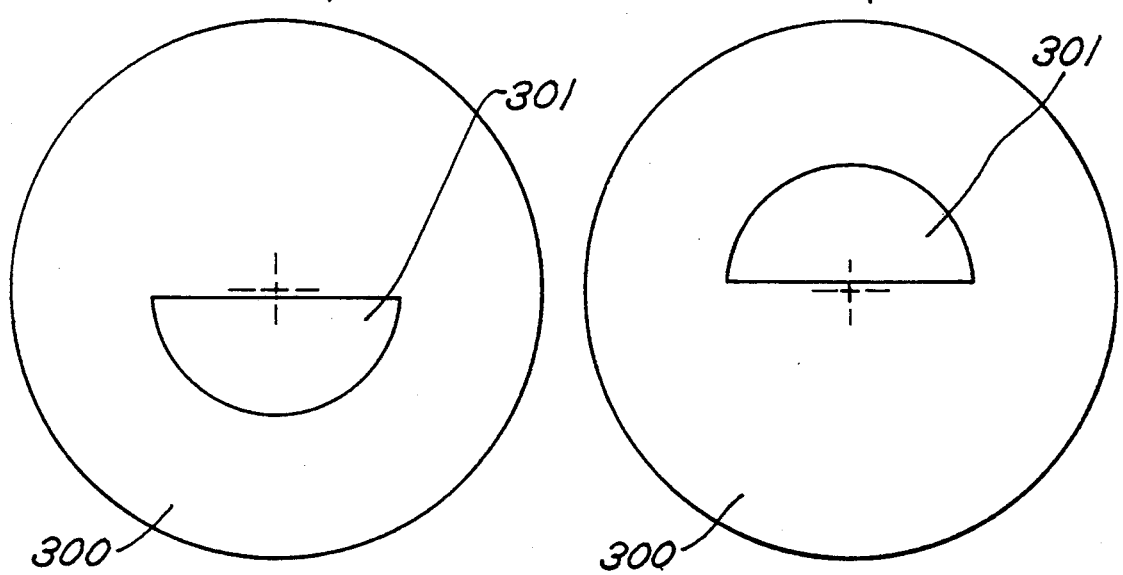

Substantial simplification of apparatus for making large encased meat products with flat ends can be achieved by using an aft end plate with a closeable opening for passage of pressurized food from the stuffing horn. Further simplification can be achieved by widening the rim so it can be used as a sizing disc. When used with an aft reinforcing band, the apparatus for stretching the band over the sizing disc as in FIGS. 62-66 is eliminated. A further simplification is the elimination of the separate aft end plate insertion as in FIGS. 62-63. Eliminating the band stretching step simplifies the band construction by providing a high level of reliability without a high level of quality control. It also provides improved band material optimization by eliminating the requirement for high stretch and return without excessive set. Aft end plates with closeable openings, however, have severe design limitations of cost, overall thickness, food leakage, sanitation and jamming due to food fibers. FIGS. 67 and 68 show one principle that has been found to provide closeable openings within these limitations.

FIG. 67 shows two thin metal reusable end plates 300 with similar configurations comprised of off-center openings 301 in identical location when axially aligned and providing a suitable passage for food. FIG. 68 shows the same two end plates, but with one rotated 180° and thereby closing the opening and overlapping along the straight edges. The flat rotating plates eliminate entrapment of food between surfaces and the thin metal will shear food fibers effectively. Sanitation problems are minimized and cost would be acceptable. Thickness, however, is less than the ¼" to ⅜" required for good sizer action.

FIGS. 69 and 70 show an integration of two thin metal discs 305 and 306 with a thicker plastic disc 302 that provides suitable sizing. FIG. 69 is an aft end axial view with the integrated end plates 305 and 306 in open position 301 and a transverse section of the forward end of modified stuffing horn 303 with horn end collar 304. The end collar provides a stabilizing backup for the end plate when it is placed over the tip of the horn. This relationship is shown in FIG. 70. FIG. 70 also shows forward end plate 75, which is lightly held to the aft integrated end plate by a shallow "snap in" recess in the rim of the plastic disc 302. Forward end plate 75 is pushed out of the recess when stuffing begins. The integrated forward end plate disc 306 is firmly attached to the plastic disc by tab extensions 308 from the periphery of the forward end plate disc. The tabs pass through close fitting flat holes molded in the plastic. The tabs pass beyond the holes and are bent 90° into circular recess 309. The forward end plate disc is thus locked securely to the plastic disc, which does not rotate. Aft end plate disc 305 is rotated by the flat portion of rotatable stuffing horn 303. Outer rim 310 of end plate disc 305 rotates freely in a narrow and deep circular groove in the plastic disc around axis 312 and closes passage 301.

Figure 73:
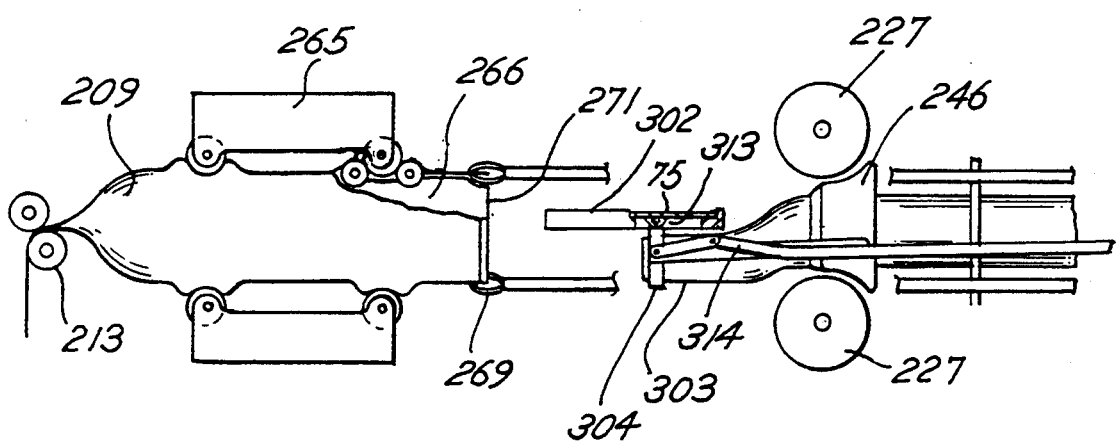
FIGS. 73-75 are schematic cross-sectional side views of apparatus for installing integrated aft end plates.

Near the center of the end plate disc 305 is a shallow U-shaped metal rod projection 311 that is grasped by spring clip 313 in FIG. 73 when pushed into the spring clip by the integrated end plate feed magazine (not shown).

Figure 74:
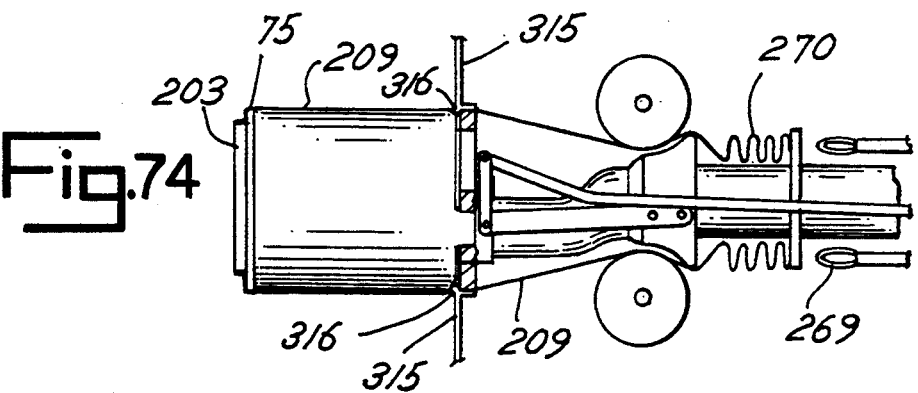

FIG. 73 is a schematic of the apparatus that uses the integrated aft end plate of FIGS. 69-72. Casing 209 is opened and passed over casing carrier 265-266 to the aft edge 271 of the casing carrier. During this process, a feed magazine of integrated end plates FIGS. 69-70 approaches the spring clip 313 and pushes the U rod into the clip to hold the integrated end plate parallel to the horn axis. Casing pullers 269 move forward to grasp the edges of the casing at 271 and pull it back over the end plate and into the shirring rolls 227. At this point, casing carrier 265 moves upward out of line with the stuffing horn axis. When the shirring rolls have grasped the casing and begun shirring, push rod mechanism 314 pushes the end plate toward an upright position within the casing as it is shirred so it is fully upright when the reinforcing band 203 on the forward end of the casing arrives and stops the casing movement. Stuffing begins and pressurized food pushes end plate 75 forward. As shown in FIG. 74, during the forward movement of the casing, multiple brake fingers 315 controllably press the casing against the rim of the integrated end plate to control product size. Inwardly projecting portions 316 of the brake fingers hold the end plate against the horn collar.

Figure 75:
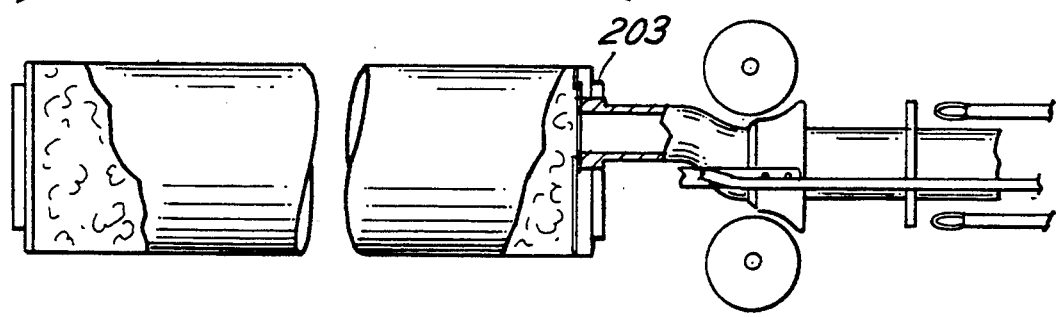

In FIG. 75, when the aft reinforcing band 203 comes to the aft end plate, food flow is terminated and the stuffing horn with aft metal disc in the integrated end plate rotates 180° to close the food passage. The brake fingers move the finished product forward clear of the stuffing horn collar and release the finished product.

Push rod mechanism 314 and the rotating horn return to FIG. 73 position. Casing carrier 265 returns to its starting position with its axis in line with the stuffing horn axis, and next casing length is moved to edge 271. It is then ready for the next cycle to begin.

Another type of aft or second end plate with a closeable opening is shown in FIGS. 76-79. This end plate uses leaf spring closures 318 that are forced open by matching leaf spring closures 327 on stuffing horn 326 which has a square end cross section to match the square opening in the end plate. When the food in the stuffing horn is pressurized, it pushes open the horn closures which in turn push the aft end plate closures open. The opening of the aft end plate closures pushes the first end plate 75 forward from its snap-on position 325. As the flow continues, the casing 209 is pulled forward by the casing reinforcing band 203 interaction with the first end plate and stuffing proceeds until the casing is filled and stretched to its predetermined desired size and the pressurizing pump is stopped.

When the flow stops, the combined closing force of the leaf springs of the stuffing horn and the aft end plate cause them to force their way through the food emulsion and return to a closed condition. The food in the horn prevents removal of the food in the casing during this retraction of the closures. An appropriate preset in the springs holds them tightly closed. During stuffing and movement through the emulsion to return to a closed condition, the match of the stuffing horn leaf springs and the end plate leaf springs minimize the amount of food emulsion remaining on the outer surface of the end plate closure. This is important in minimizing the quantity of food clinging to the outer surface of leaf spring closure that would be wasted.

FIG. 79 shows the beveled elastomer seal 328 that supports the food pressure from within the stuffed casing 209 after stuffing and especially during heat processing. The metal end plate disc 324 is coated with elastomer 319 which has a bevel that supports leaf spring closure 318 and seals against significant leakage.

With variations, FIGS. 76-79 are used with the casing handling and stuffing system shown in FIG. 58-60 and especially FIGS. 73-75. The principal variation from FIGS. 73-75 is that a straight stuffing horn 326 with the forward end having a square cross section replaces the off center horn end 303.

The integral sizing discs of FIGS. 69-72 and FIGS. 76-79 provide simplicity of operation, but the thickness required for adequate sizing uniformity may increase the volume of end plate storage and handling 2 to 4 fold or more. Alternate sizing apparatus shown in FIGS. 80-85 eliminates the extra bulk and cost of end plates with integral sizing discs, while retaining the ability to avoid stretching the reinforcing band on the aft end of the casing.

FIGS. 80-85 show the use of the tilted discs as in FIGS. 58-61, but further include an aft or second end plate 328 with a closeable opening, in addition to the first end plate 75. The standard sizing disc 221 of FIG. 58 is replaced with a contractible sizing disc 329-331. In FIG. 82, an elastomer ring 330 is contracted to a circumference that will allow the casing reinforcing band 203 to pass forward over the elastomer ring and come to rest against the aft end plate where axial casing tension is restrained by the band.

FIG. 81 shows elastomer ring 330 expanded to act as a sizing disk during stuffing. The elastomer ring is expanded by fluid pressure entering through tube 332. Water is the preferred fluid. The pressurized fluid is contained within unit 331, having two annular walls attached to an inner cylindrical section. Sealing is improved by thinned edges 335 of the inner portion of the elastomer ring. Controllable multiple brake fingers 333 contact the outer rim of the expanded ring 330 to control the size and centering of ring 330 in conjunction with the controllable pressure of fluid entering through tube 332. Brake finger heel 334 holds aft end plate 328 in place. The brake fingers and heels move radially outward to release the finished product of FIG. 84.

An important problem in the past with elastomer sizing rings had been the high and irregular coefficient of friction. Bonding low friction material to the periphery of the elastomer sizing rings has not provided a long term solution because of bond failure. Repeated stretching causes durable low friction material to yield and loosen. FIG. 85 shows a solution. Axial grooves 335 between segments of low friction material 326 relieves the stretching and bond failure of low coefficient material. The preferred material for the low friction material is impregnated teflon such as Rulon ®, which is available with the inner surface prepared for bonding.

The contractible sizing disc is especially advantageous with aft or second end plates having closeable openings because such end plates are located forward of sizing disc throughout the stuffing operation. It could be used, for example, with FIGS. 67-72 which could be modified in design to substantially reduce its bulk and cost. The same is true of FIGS. 76-79.

A third variety of aft end plate with a closeable opening utilizes a thin end plate with a simple hole. In FIG. 83, a plastic disc closure 336 is pushed between the aft end plate and the contractible sizing disc when stuffing horn 234 is retracted from its position with its forward end within the hole in the aft end plate during stuffing. The retraction as shown in FIG. 83 creates a brief void in the food emulsion that permits the disc to be inserted quickly without leakage past the closing disc. The sizing disc 330-331 is moved aft at the same time to relax compressed closed cell foam 329 shown in FIGS. 82-85 between the sizing disc and the aft end plate. The expansion of the closed cell foam 329 fills the space in lower portion of FIG. 83 during retraction of the stuffing horn 234 and the sizing disc 330-331 and insertion of closure disc 336. The closure disc recompresses the foam during its passage. Broken lines 337 in FIG. 85 show the path of the closure disc as it is inserted. FIG. 83 shows the casing reinforcing band 203 flattened against the aft end plate during passage of the closure disc. This is a relatively small portion of the band and causes no problems.

When the closure disc is centered over the hole in the end plate, stuffing horn 234 advances and pushes the closure disc into the hole. The rounded rim of the sizing disc hole fits into the depressed center of the rim of the closure disc and holds it in place against the pressure inside the encased product as in FIG. 84. The low compression modulus of the plastic material of the end plate and the plastic closure disc allows them to be snapped together. Polysulfone is the preferred plastic for the end plate, but a less expensive plastic should be used for the closure discs because they are consumable, and various plastics may be used to obtain optimum characteristics for a particular application.

While reusable end plates that are washed between usage are preferred, the foregoing principles could also be applied to disposable end plates of tin plated steel, or other materials could be used with a snap-in closure disc of metal or plastic.

Other variations of an end plate with a closeable opening in combination with sizing disc capability may be developed without departing from the broad concepts described herein.

While several preferred embodiments of the invention has been described hereinabove, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended claims, rather than by the foregoing description, and all changes which come within the meaning and range of equivalency of the claims are intended to be embraced herein.

What is claimed is:

1. A flat end plate for retaining a food product stuffed into an elongated elastic casing during processing, said flat end plate comprising
    a flat inner surface, and an outer surface having a peripheral boundary area,
    said flat inner surface being adapted to press against the food product at an end of said casing, and said outer surface including holding means to engage said casing and oppose an outward force directed along the longitudinal axis of the casing and against said flat inner surface during stuffing.

2. The flat end plate according to claim 1, wherein said holding means includes a plurality of pins projecting from said outer surface of said flat end plate for piercing and holding said casing.

3. The flat end plate according to claim 2, wherein said plurality of pins are equally spaced at a uniform distance from the periphery of said flat end plate.

4. The flat end plate according to claim 2, wherein said plurality of pins are manipulable after piercing.

5. The flat end plate according to claim 3, wherein said plurality of pins are bendable for clamping said casing against said flat end plate.

6. The flat end plate according to claim 1, wherein said holding means includes two rows of pins, each row being a uniform distance from the periphery of said flat end plate.

7. The flat end plate according to claim 6, wherein the pins of the second circular row are located on different radial lines from the radial lines of the pins of the other row.

8. The flat end plate according to claim 1, wherein said holding means includes an adhesive for bonding said casing to the outer surface of the flat end plate.

9. The flat end plate according to claim 1, wherein said holding means includes a deformable metal member which is deformed for holding said casing by clamping force.

10. The flat end plate according to claim 8, wherein said holding means includes an adhesive for assisting holding by the metal member.

11. The flat end plate according to claim 1 wherein said holding means is located in said peripheral boundary area of said outer surface.

12. The flat end plate according to claim 1, wherein said holding means includes an adhesive for bonding the casing to said peripheral boundary area.

13. The flat end plate according to claim 2 wherein at least one of said pins is configured to approximate a right triangle in profile having one of its perpendicular sides facing normal to said outer surface.

14. An end unit for retaining a food product stuffed into an elongated elastic casing during processing, said end unit comprising
    a flat inner surface for contacting said food product, and
    a casing confronting side surface, said casing confronting side surface being substantially perpendicular to said flat inner surface, said casing confronting side surface terminating in an edge, said edge being configured to restrain said casing.

15. An end unit for retaining a food product stuffed into an elongated elastic casing during processing, said end unit comprising
    a flat inner surface for contacting said food product, and
    a casing confronting side surface, said casing confronting side surface being sloped, whereby a plurality of said end units may be more compactly stored by reducing the space between a pair of flat inner surfaces.

16. The flat end plate according to claim 13, wherein said right triangle pin is molded integrally with said flat end plate.

17. A method for encasing a food product by a stuffing horn assembly having a fore end and an aft end, using a flat end plate, and an elastic tubular casing, said flat end plate comprising;
    a flat inner surface,
    and an outer surface having a peripheral boundary area,
    said flat inner surface being adapted to press against the food product, and said outer surface including holding means to engage said casing and oppose an outward force directed along the longitudinal axis of the casing and against said flat inner surface during stuffing said method comprising:
    a. delivering said first flat end plate to the stuffing horn assembly;
    b. retaining said flat end plate adjacent to the fore end of the stuffing horn assembly;
    c. pulling a length of elastic tubular casing material over the stuffing horn assembly so as to locate the terminal end of the casing adjacent to the fore end of the stuffing horn assembly;
    f. positioning the flat end plate within the terminal end of the casing;
    g. securing the end plate within the terminal end of the casing material by cooperatively engaging a portion of the terminal end of the casing extending axially beyond the end plate to the end plate for retaining and securing the food within the casing.

18. A method according to claim 17 and further including the steps of:

delivering a pressurized flow of food product into the tubular casing through the stuffing horn;

interrupting the flow of food product at a predetermined point; and securing the forward end of the casing.

19. Apparatus for making an elongated encased food product having at least one substantially flat end, said apparatus encasing a food product in a length of elastic elongated casing material having a forward end and a terminal end, and utilizing a flat end plate, said apparatus comprising:

a. a stuffing horn assembly having a fore end and an aft end, said stuffing horn assembly for forcing food product from its fore end into an elastic elongated casing material;

b. an end plate retainment means for receiving, and retaining a flat end plate at a location proximate to the fore end of the stuffing horn assembly;

c. means for delivering a flat end plate to said end plate retainment means;

d. means for pulling a length of elongated casing material over said stuffing horn assembly and into a position at which the terminal end of the casing material is proximate to said fore end of said stuffing horn assembly; and e. means for securing the end plate retained within said retainment means to the terminal end of the casing material, by cooperatively engaging a portion of the terminal end of the casing material extending axially beyond the end plate to the end plate, for retaining and securing the food within the casing material.

20. Apparatus as in claim 19 wherein said plate retainment means comprises a sizing disk.

21. Apparatus as in claim 20 wherein said sizing disk further includes: a cavity; and a slot through which a flat end plate may be inserted into a cavity.

22. Apparatus as in claim 19 wherein said means for pulling the length of casing material over said stuffing horn assembly and onto the outer sleeve further comprises rotatable elastomeric rolls arranged around the axis of said stuffing horn assembly.

23. Apparatus as in claim 22 wherein said elastomeric rolls further comprises means for shirring the casing along the axis of the stuffing horn assembly as the casing moves toward the aft end of said stuffing horn assembly.

24. Apparatus as in claim 23 and further including a pressurized air supply is provided between the sizing disk and the rotating elastomeric rolls, for reducing contact between said sizing disk and the casing.

25. Apparatus as in claim 22 and further including an axially moveable collar located on said stuffing horn assembly aftward of said elastomeric rolls, said collar tightly engaging the casing against said elastomeric rolls in a first position and permitting free forward passage of the casing in a second position further aft of said elastomeric rolls.

26. Apparatus as in claim 19 and further including an end plate having an inner and outer peripheral area.

27. Apparatus as in claim 26 wherein the outer peripheral area of the end plate comprises a plurality of pins configured to pierce the casing material.

28. Apparatus as in claim 26 wherein the outer peripheral area of said end plate comprises a deformable metal member.

29. Apparatus as in claim 26 wherein the outer peripheral area of the end plate comprises a hot melt adhesive coating.

30. Apparatus as in claim 26 wherein the outer peripheral area of said the end plate comprises a deformable metal coated with hot melt adhesive.

31. Apparatus as in claim 19 and further including a length of elastic elongated casing material comprising a reinforcing band bonded to the terminal end of the casing.

32. Apparatus as in claim 19 wherein the means for securing the end plate to the casing material, comprises a heat source forward of said end plate retainment means.

33. Apparatus as in claim 19, wherein a second flat end plate is positionable within the casing material adjacent to the forward casing edge, comprising:

a. means for stretching the casing edge to a circumference at least as large as said second flat end plate;

b. means for pushing the second end plate into the stretched casing adjacent to the forward casing edge; and c. means for releasing the stretched casing onto the second flat end plate; whereby the second flat end plate cooperatively engages a portion of the forward edge end of the casing material extending axially beyond the second end plate to retain and secure the second end plate within the casing material.

34. Apparatus as in claim 33 and further including a second end plate comprising an inner and an outer peripheral area, said outer peripheral area facing toward the fore end of the stuffing horn assembly.

35. Apparatus as in claim 34 wherein said outer periphery of said second flat end plate comprises a plurality of pins configured to pierce the casing material when the casing material is pressed against the pins.

36. Apparatus as in claim 32 and further comprising a push plate capable of pressing the casing material adjacent to the forward edge onto the second flat end plate.

37. Apparatus as in claim 33 wherein said means for stretching the casing edge further comprises a plurality of radially moveable fingers.

38. Apparatus as in claim 33 where in said second flat end plate defines an opening configured to permit stuffing the food product through said second end plate, said second end plate further comprising a moveable closure device for said opening.

39. Apparatus as in claim 38 wherein said second end plate comprises a sizing disk.

40. Apparatus as in claim 38 wherein said moveable closure comprises a plurality of disks rotatable relative to one another.

41. Apparatus as in claim 40 wherein rotation of a portion of the stuffing horn provides cooperative rotational movement of at least one disk to close the moveable closure.

42. Apparatus as in claim 38 wherein the moveable closure device comprises at least one flexibly hinged member whereby the source of pressurized food opens the device and back pressure from the encased food closes the device assisted by at least one flat sprint element.

43. Apparatus as in claim 38 wherein the moveable closure device comprises at least one flexibly hinged member comprising at least one flat spring element assisted by at least one flat spring element attached to the forward end of the stuffing horn assembly.

44. Apparatus as in claim 20 wherein said sizing disk further comprises a first position in which it is tilted relative to the axis of the stuffing horn assembly, to present a reduced profile whereby the forward edge of the casing may pass freely onto the stuffing horn assembly, and a second position in which the sizing disk is perpendicular to the axis of the stuffing horn assembly, in preparation for stuffing the casing with food product.

45. Apparatus as in claim 44 further comprising a carrier for elastic casing material having means for opening the flat casing and movably supporting and forming the casing into an oval shape that will fit over the tilted sizing disk and first end plate.

46. Apparatus as in claim 45 wherein the carrier further comprises pulling means moveable substantially parallel to the axis of the stuffing horn assembly from a first position adjacent to the tilted sizing disk to a second position aft of the first position whereby the forward edge of the casing is engaged by said rotatable elastomeric rolls.

47. Apparatus as in claim 33 wherein said means for stretching the casing edge further comprises a plurality of radially moveable fingers.

48. Apparatus as in claim 45 wherein a temporary localized reduction of food product pressure at the forward edge end of the casing material following stuffing is utilized for positioning the second end plate without significant leakage of food product.

49. Apparatus as in claim 46 wherein said pulling means further comprises a plurality of tubular retrieving clamps.

50. Apparatus as in claim 33 and further including a length of elongated casing material comprising at least one reinforcing band bonded to said casing.

51. Apparatus as in claim 20 wherein the sizing disk further comprises a first position in which it is expanded relative to the radial axis of the stuffing horn assembly and a second position in which it is contracted, whereby the casing reinforcing bands may be pulled over the contracted sizing disk and onto the second end plate with less stretching of the bands relative to the first position.

52. Apparatus as in claim 33 wherein the second end plate is held by a casing reinforcing band.

53. Apparatus as in claim 35 wherein the second end plate is held by a casing reinforcing band.

54. Apparatus as in claim 47 wherein said radially moveable fingers stretch the casing to press against an elastomer ring surrounding said fingers and casing.

* * * * *